(12) United States Patent
Vikramaratne

(10) Patent No.: US 12,056,163 B2
(45) Date of Patent: *Aug. 6, 2024

(54) COLLABORATION ACTIVITY SUMMARIES

(71) Applicant: Box, Inc., Redwood City, CA (US)

(72) Inventor: Victor De Vansa Vikramaratne, Sunnyvale, CA (US)

(73) Assignee: Box, Inc.

( * ) Notice: Subject to any disclaimer, the term of this patent is extended or adjusted under 35 U.S.C. 154(b) by 225 days.

This patent is subject to a terminal disclaimer.

(21) Appl. No.: 17/336,221

(22) Filed: Jun. 1, 2021

(65) Prior Publication Data

US 2021/0286827 A1    Sep. 16, 2021

Related U.S. Application Data

(63) Continuation of application No. 15/728,486, filed on Oct. 9, 2017, now Pat. No. 11,030,223.

(51) Int. Cl.
| | | |
|---|---|---|
| *G06F 16/28* | (2019.01) |
| *G06F 3/0484* | (2022.01) |
| *G06F 16/25* | (2019.01) |
| *G06F 16/9535* | (2019.01) |
| *G06F 16/9536* | (2019.01) |
| *G06F 16/9538* | (2019.01) |

(Continued)

(52) U.S. Cl.
CPC .......... *G06F 16/287* (2019.01); *G06F 16/258* (2019.01); *G06F 16/9535* (2019.01); *G06F 16/9536* (2019.01); *G06F 16/9538* (2019.01); *G06Q 10/101* (2013.01); *G06Q 10/103* (2013.01); *G06F 3/0484* (2013.01)

(58) Field of Classification Search
CPC .. G06F 16/287; G06F 16/258; G06F 16/9535; G06F 16/9536; G06F 16/9538; G06F 3/0484; G06Q 10/101; G06Q 10/103
See application file for complete search history.

(56) References Cited

U.S. PATENT DOCUMENTS

| | | |
|---|---|---|
| 7,039,642 B1 | 5/2006 | Horvitz et al. |
| 7,669,123 B2 | 2/2010 | Zuckerberg et al. |

(Continued)

OTHER PUBLICATIONS

Non-Final Office Action dated Apr. 29, 2020 for U.S. Appl. No. 16/136,207.

(Continued)

*Primary Examiner* — Rami R Okasha
(74) *Attorney, Agent, or Firm* — Vista IP Law Group, LLP

(57) ABSTRACT

System and methods for summarizing collaboration activity events into a plurality of pages that are then scored with respect to user-specific relevance that is based on a set of comprehensibility characteristic parameters. The collaboration activity events are summarized into groups of activities based on certain common attributes that are deemed to have quantitatively measurable relevance to the user. The groups of activities are assembled into a plurality of personalized candidate pages. The candidate summary pages are then scored using a function that includes parameters that serve to quantify how interesting or readable the particular user would find the particular candidate summary page. One or more of the higher scoring candidate summary pages are selected for presentation to the user.

20 Claims, 14 Drawing Sheets

(51) Int. Cl.
  *G06Q 10/10* (2023.01)
  *G06Q 10/101* (2023.01)

(56) References Cited

U.S. PATENT DOCUMENTS

| | | | |
|---|---|---|---|
| 8,381,306 B2 | 2/2013 | Mcpherson et al. | |
| 8,965,983 B2* | 2/2015 | Costenaro | G06Q 10/10 715/255 |
| 9,697,210 B1 | 7/2017 | Lee | |
| 9,805,042 B1 | 10/2017 | Meyer | |
| 9,824,094 B1 | 11/2017 | Meyer | |
| 9,990,365 B1 | 6/2018 | Kilpatrick | |
| 10,074,015 B1 | 9/2018 | Grundmann et al. | |
| 10,102,305 B1 | 10/2018 | Chang | |
| 10,218,784 B2 | 2/2019 | Ju et al. | |
| 10,452,993 B1 | 10/2019 | Hart | |
| 10,997,499 B1 | 5/2021 | Kayyoor et al. | |
| 2002/0069360 A1 | 6/2002 | Thoone et al. | |
| 2002/0120734 A1 | 8/2002 | Riosa | |
| 2004/0054566 A1 | 3/2004 | J'maev | |
| 2005/0010593 A1 | 1/2005 | Fellenstein | |
| 2005/0235318 A1 | 10/2005 | Grauch et al. | |
| 2006/0161543 A1 | 7/2006 | Feng et al. | |
| 2007/0283443 A1 | 12/2007 | McPherson | |
| 2008/0077462 A1 | 3/2008 | Patel | |
| 2008/0183665 A1 | 7/2008 | Brinker et al. | |
| 2008/0195587 A1 | 8/2008 | Hussami | |
| 2009/0164537 A1 | 6/2009 | Huang | |
| 2009/0248615 A1 | 10/2009 | Drory | |
| 2009/0276492 A1* | 11/2009 | Bobbitt | G06Q 10/10 709/205 |
| 2012/0192086 A1 | 7/2012 | Ghods | |
| 2012/0233096 A1 | 9/2012 | Gupta | |
| 2012/0297313 A1 | 11/2012 | Sharma | |
| 2013/0124513 A1* | 5/2013 | Bignert | G06F 16/958 707/E17.082 |
| 2013/0179381 A1 | 7/2013 | Kawabata | |
| 2013/0179799 A1 | 7/2013 | Savage | |
| 2013/0262598 A1 | 10/2013 | Makanawala | |
| 2013/0297689 A1 | 11/2013 | Bhat | |
| 2013/0311467 A1 | 11/2013 | Gallé et al. | |
| 2013/0318593 A1 | 11/2013 | Smith | |
| 2013/0332195 A1 | 12/2013 | Galuten | |
| 2014/0006977 A1 | 1/2014 | Adams | |
| 2014/0081904 A1 | 3/2014 | Sitrick | |
| 2014/0327622 A1 | 11/2014 | Ouyang et al. | |
| 2015/0134693 A1 | 5/2015 | Chan | |
| 2015/0207701 A1 | 7/2015 | Faaborg | |
| 2015/0331578 A1 | 11/2015 | Keslin | |
| 2015/0372855 A1* | 12/2015 | Kushmerick | H04L 67/10 709/224 |
| 2016/0065627 A1 | 3/2016 | Pearl | |
| 2016/0098390 A1 | 4/2016 | Kitajima | |
| 2016/0260336 A1 | 9/2016 | Chapman | |
| 2016/0321311 A1 | 11/2016 | Tallamraju | |
| 2016/0373476 A1 | 12/2016 | Dell'anno et al. | |
| 2017/0063818 A1 | 3/2017 | Niewczas et al. | |
| 2017/0139550 A1* | 5/2017 | Milvaney | G06F 3/04842 |
| 2017/0168692 A1 | 6/2017 | Chandra et al. | |
| 2017/0185687 A1 | 6/2017 | Pai et al. | |
| 2017/0277907 A1 | 9/2017 | Dang et al. | |
| 2017/0318020 A1* | 11/2017 | Kamath | G06F 16/183 |
| 2017/0364568 A1 | 12/2017 | Reynolds et al. | |
| 2018/0032609 A1 | 1/2018 | Allen et al. | |
| 2018/0062852 A1 | 3/2018 | Schmahmann | |
| 2018/0081503 A1 | 3/2018 | Green et al. | |
| 2018/0284959 A1 | 10/2018 | Alphin et al. | |
| 2018/0349623 A1 | 12/2018 | Morard et al. | |
| 2019/0130031 A1 | 5/2019 | Gourley | |

OTHER PUBLICATIONS

Final Office Action dated Jul. 13, 2020 for U.S. Appl. No. 16/264,357.
Notice of Allowance dated Jul. 27, 2020 for U.S. Appl. No. 16/136,200.
Final Office Action dated Nov. 9, 2020 for U.S. Appl. No. 16/136,207.
Activity Stream—Wikipedia, URL:https://en.wikipedia.org/wiki/Activity_stream, Oct. 28, 2019.
Final Office Action dated Mar. 13, 2020 for U.S. Appln. No. 16/136,196.
Non-Final Office Action dated Mar. 20, 2020 for U.S. Appl. No. 16/264,357.
Non-Final Office Action dated Nov. 1, 2019 for U.S. Appln. No. 16/136, 196.
Non-Final Office Action dated Dec. 12, 2019 for U.S. Appl. No. 16/136,200.
Tata, Sandeep, et al. "Quick access: building a smart experience for Google drive." Proceedings of the 23rd ACM SIGKDD International Conference on Knowledge Discovery and Data Mining. ACM, 2017.
Non-Final Office Action dated Apr. 16, 2021 for U.S. Appl. No. 16/264,357.
Final Office Action for U.S. Appl. No. 15/728,486 dated Sep. 30, 2019.
Non-Final Office Action for U.S. Appl. No. 15/728,486 dated Jul. 28, 2020.
Non-Final Office Action for U.S. Appl. No. 15/728,486 dated May 30, 2019.
Notice of Allowance for U.S. Appl. No. 15/728,486 dated Feb. 2, 2021.
Final Office Action dated Sep. 30, 2019 for U.S. Appl. No. 15/728,486.
Non-Final Office Action dated May 30, 2019 for U.S. Appl. No. 15/728,486.
Final Office Action for U.S. Appl. No. 16/264,357 dated Jul. 13, 2020.
Notice of Allowance for U.S. Appl. No. 16/136,200 dated Jul. 27, 2020.
Final Office Action for U.S. Appl. No. 16/136,207 dated Nov. 9, 2020.
Non-Final Office Action for U.S. Appln. No. 16/136,196 dated Mar. 10, 2021.
Non-Final Office Action for U.S. Appl. No. 16/264,357 dated Apr. 16, 2021.
Final Office Action for U.S. Appln. No. 16/136,196 dated Jul. 15, 2021.
Notice of Allowance for U.S. Appl. No. 16/136,207 dated May 13, 2021.
Final Office Action for U.S. Appl. No. 16/264,357 dated Aug. 6, 2021.
Non-Final Office Action for U.S. Appl. No. 16/264,357 dated Mar. 11, 2022.
Non-Final Office Action for U.S. Appln. No. 16/136,196 dated Feb. 8, 2022.
Final Office Action for U.S. Appl. No. 16/264,357 dated Jul. 13, 2022.
Non-Final Office Action for U.S. Appl. No. 16/264,357 dated Nov. 29, 2022.
Final Office Action for U.S. Appln No. 16/136,196 dated Jun. 21, 2022.
Notice for Allowance for U.S. Appl. No. 16/136,196 date Mar. 8, 2023.
Notice of Allowance dated Jun. 23, 2023 for U.S. Appl. No. 16/264,357.
Notice of Allowance dated Nov. 8, 2023 for U.S. Appl. No. 16/264,357.

* cited by examiner

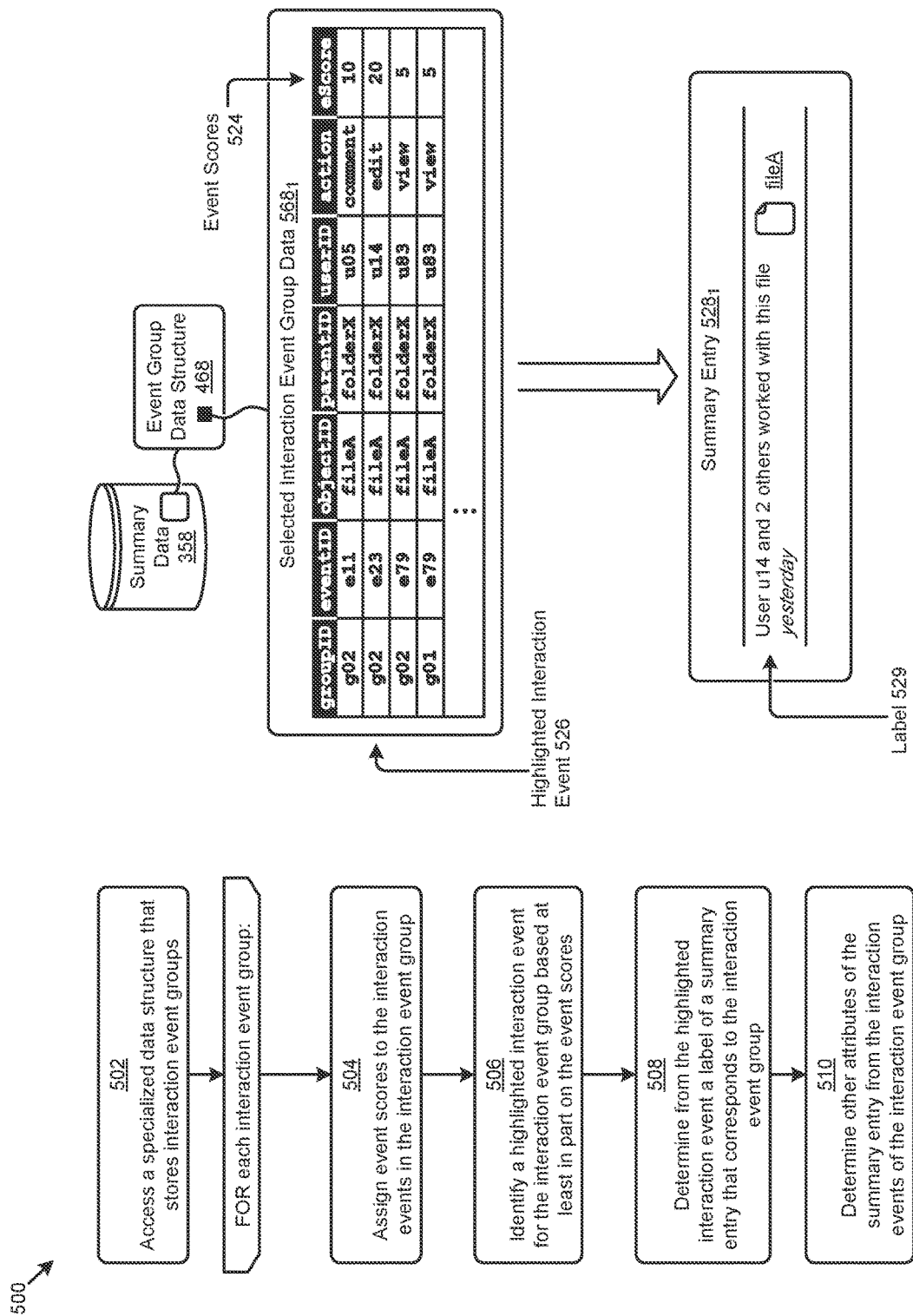

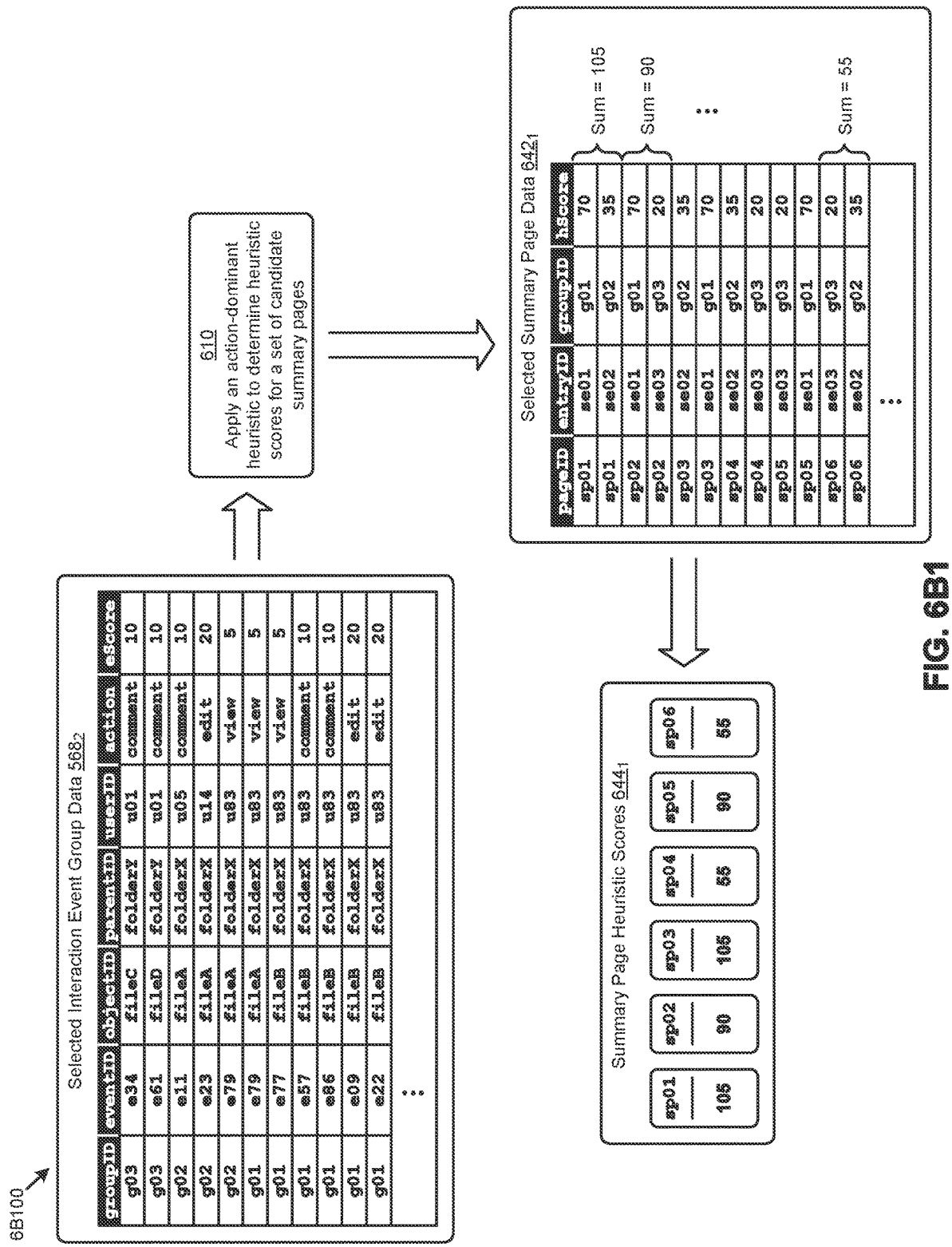
FIG. 6B1

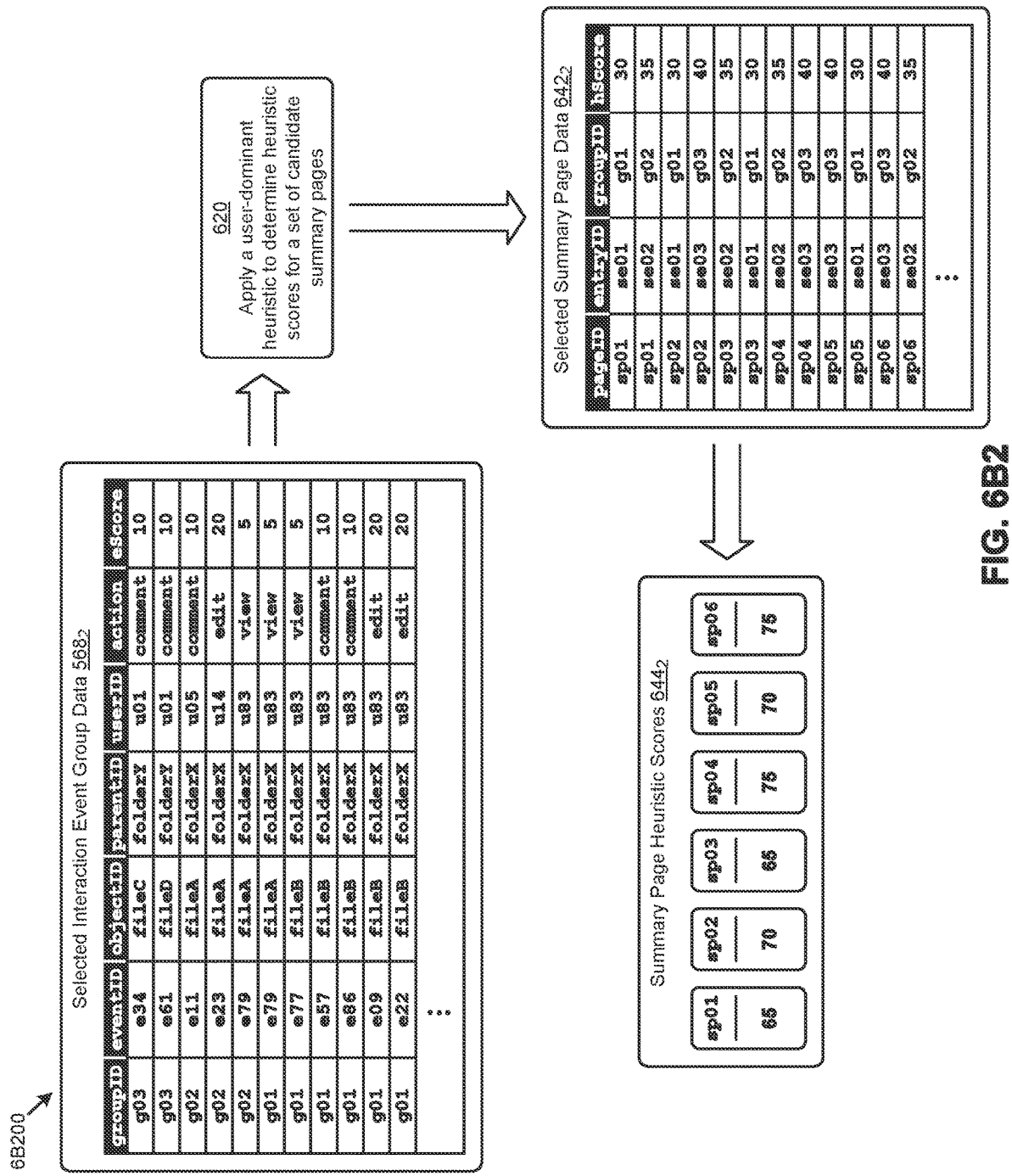
FIG. 6B2

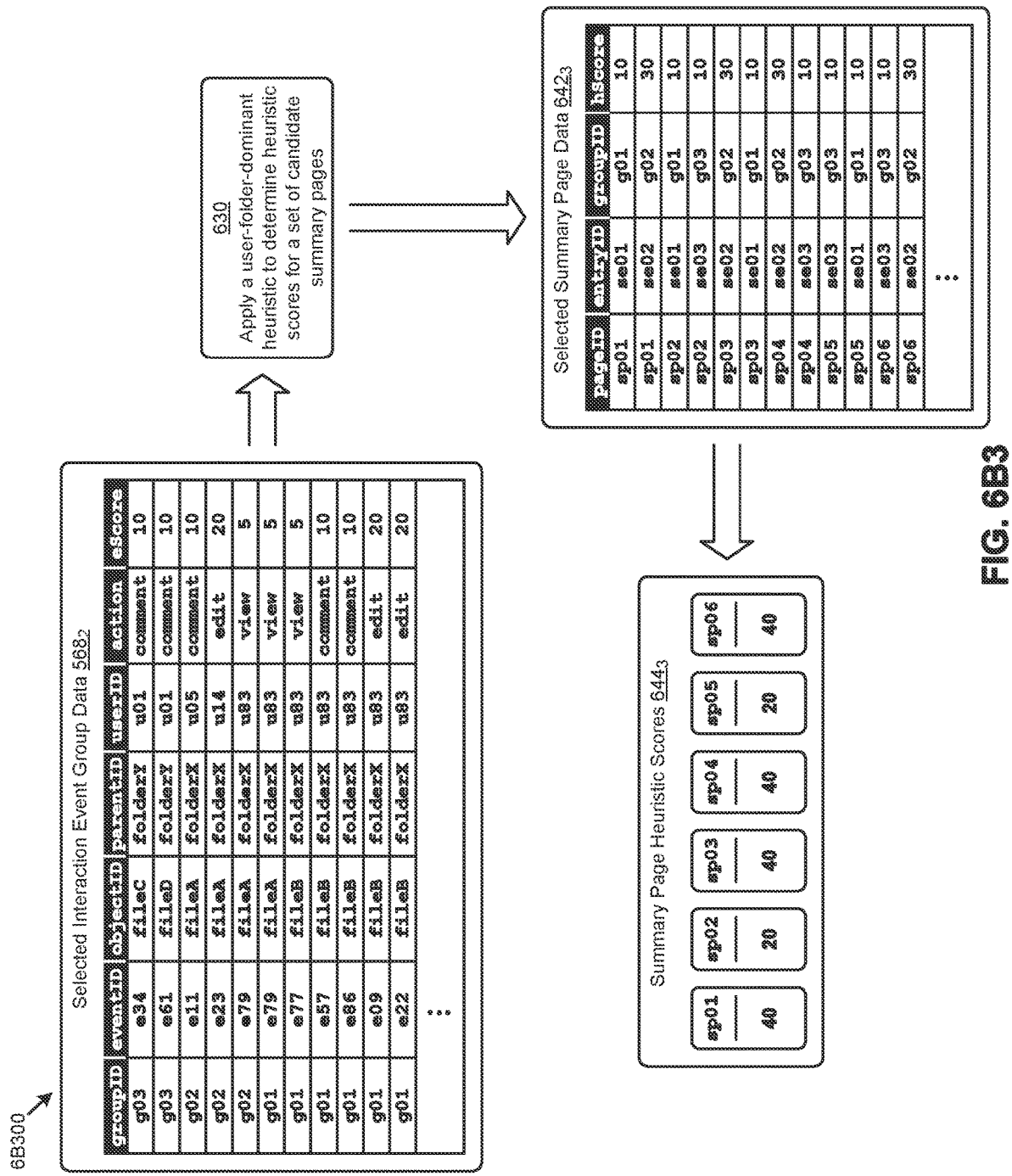
FIG. 6B3

COLLABORATION ACTIVITY SUMMARIES

CROSS REFERENCE TO RELATED APPLICATION(S)

This disclosure is a continuation of U.S. patent application Ser. No. 15/728,486 entitled "COLLABORATION ACTIVITY SUMMARIES" and filed on Oct. 9, 2017. The content of the aforementioned U.S. patent application is hereby explicitly incorporated into the present disclosure by reference for all purposes.

FIELD

This disclosure relates to shared content management systems, and more particularly to techniques for generating and scoring collaboration activity summaries.

BACKGROUND

Users of modern computing systems collaborate over large volumes of computer-readable content objects (e.g., text files, spreadsheets, mixed text and graphics documents, programming code files, etc.). Such content objects are shared with and/or collaborated over by large numbers of collaborators. Large-scale collaboration systems are characterized by a high volume of interaction events (e.g., authoring, editing, viewing, sharing, commenting, etc.), which events are associated with activities performed by or on behalf of collaborators over one or more of the content objects.

Many enterprises encourage collaboration activities and deploy systems that support collaboration so as to boost efficiency, productivity, and creativity throughout the enterprise. For example, an enterprise having thousands of employees (e.g., administrators or users-at-large of a set of many computing and storage platforms) and many terabytes of content (e.g., many thousands of folders comprising many thousands or millions of files, etc.) might use a cloud-based content management platform to efficiently and securely facilitate content access to various individual users and/or collaborative groups of users. The makeup of the users (e.g., collaborators) is often very dynamic (e.g., employees come and go, roles change, mergers happen, etc.) as is the content itself (e.g., content objects are frequently added, deleted, edited, reorganized, etc.). Further, as the benefits of collaboration become more and more apparent, the users, content objects, and content owners of the distributed computing and storage platforms keep expanding to ever larger and larger numbers. Any particular user in such a highly collaborative environment might desire to know about collaboration activities that are most pertinent to that user. Lists of collaboration activities might be presented on the display of a user device such as in a web browser window (e.g., when running a web application) or on the display screen of a user's mobile device (e.g., when running a mobile app).

Unfortunately, presenting lists of collaboration activities associated with a particular user in highly collaborative environments can result in cognitive overload for the user (i.e., volume-wise overload). Worse, some legacy approaches present collaboration interaction events "on the fly" as they occur over time, resulting in a different aspect of cognitive overload (i.e., timing-wise overload). As examples, a large number of entries describing events (e.g., "user ABC edited object XYZ") might be "on the fly" populated in a rotating carousel at the top or side of the workspace, with each entry being presented as one frame of the carousel. With such approaches, the volume and rate of the presentation of events may be cognitively incomprehensible by the user.

Further, some or all of the displayed entries may not be meaningful to the user as pertains to recommendations for collaboration and/or engagement. As one example, legacy attempts that merely present sequences of individual events fail to interrelate various actions of groups of users. As another example, legacy implementations make no attempt to summarize related activities or to summarize groups of other users that are related to the particular user. What is needed is a technological solution that presents collaboration activity summaries in a form that can be displayed as a single comprehensible page.

Therefore, what is needed is a technique or techniques to improve over legacy techniques and/or over other considered approaches that address how to construct a coherent summary page from streams of collaboration activity records. Some of the approaches described in this background section are approaches that could be pursued, but not necessarily approaches that have been previously conceived or pursued. Therefore, unless otherwise indicated, it should not be assumed that any of the approaches described in this section qualify as prior art merely by their occurrence in this section.

SUMMARY

The present disclosure describes techniques used in systems, methods, and in computer program products for forming collaboration activity summaries, which techniques advance the relevant technologies to address technological issues with legacy approaches. More specifically, the present disclosure describes techniques used in systems, methods, and in computer program products for summarizing collaboration activities from streams of collaboration events. Certain embodiments are directed to technological solutions for generating candidate summary pages comprising summaries of grouped interaction events that are then scored to determine a most comprehensible interaction activity summary page to be presented to a user.

The disclosed embodiments modify and improve over legacy approaches. In particular, the herein-disclosed techniques provide technical solutions that address the technical problems attendant to how to construct a comprehensible summary page from a plurality of candidate summary pages that are in turn formed based at least in part on one or more streams of collaboration activity records. Such technical solutions relate to improvements in computer functionality. Various applications of the herein-disclosed improvements in computer functionality serve to reduce the demand for computer processing power and network bandwidth use, at least inasmuch as the advances reduce or eliminate the need for a user to have to repeatedly probe databases of events. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of collaboration systems as well as advances in various technical fields related to human-machine interfaces.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 5 depicts a summary entry creation technique as implemented in systems that summarize collaboration activities from streams of collaboration events, according to an embodiment.

FIG. 6B1, FIG. 6B2, and FIG. 6B3 present candidate summary page heuristic scoring scenarios as implemented in systems that summarize collaboration activities from streams of collaboration events, according to an embodiment.

DETAILED DESCRIPTION

Figure 1A:
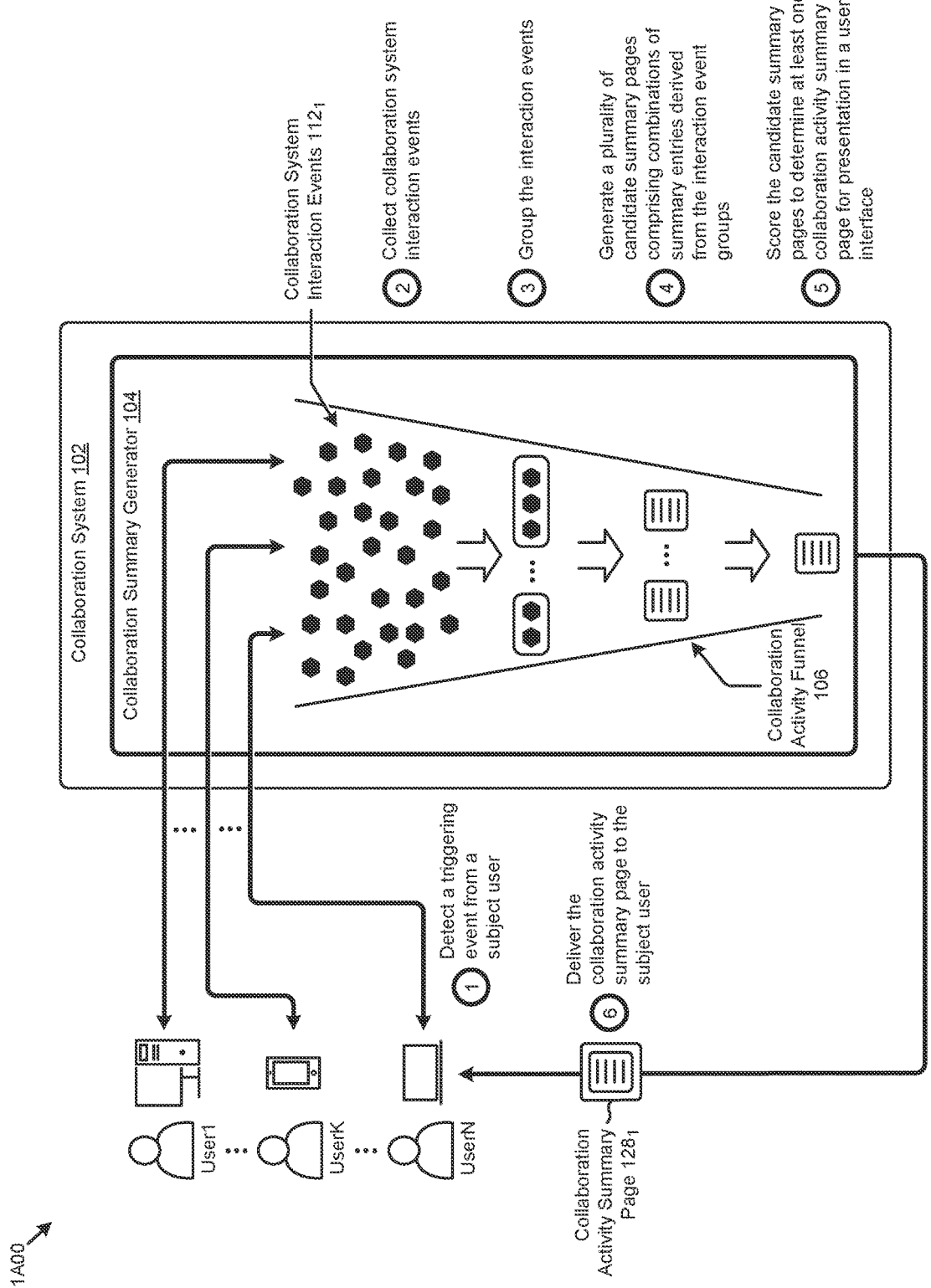
FIG. 1A depicts a computing environment in which embodiments of the present disclosure can be implemented.

Embodiments in accordance with the present disclosure address the problem of how to construct a comprehensible summary page from streams of collaboration activity records. Some embodiments are directed to approaches for generating a plurality of candidate summary pages comprising summaries of grouped interaction events, which candidate summary pages are then scored to determine a ranking of candidate summary pages so as to determine a "best" activity summary page to present to a user. The accompanying figures and discussions herein present example environments, systems, methods, and computer program products for summarizing collaboration activities from streams of collaboration events.

Overview

Disclosed herein are techniques for generating a plurality of candidate summary pages comprising summaries in the form of grouped interaction events. The candidate summary pages are scored for selection of a higher-scoring collaboration activity summary page. One of the higher-scoring collaboration activity summary pages is selected to be presented to the user.

In certain embodiments, a set of event records that correspond to interaction events of users with a collaboration system are collected. Attributes of the interaction events that are codified in the event records are used to group the interaction events. Various grouping (e.g., clustering) techniques can be used to form the interaction event groups. A summary corresponding to each interaction event group is created. Sets of candidate summary pages listing various combinations of the summaries (e.g., summaries deemed relevant to one or more users) are generated. A respective score for each candidate summary page is then determined. The summary page scores are consulted to select at least one summary page (e.g., a highest scoring summary page, or at least a higher scoring summary page) to deliver to the user. In certain embodiments, specialized data structures are formed to facilitate the herein disclosed techniques. In certain embodiments, a collaboration summary generation event that is invoked by a particular user results in at least one summary page being presented to that particular user. In certain embodiments, the summary page scores are based at least in part on one or more observations or interim results such as interaction event scores or weightings, summary page listing order, summary page diversity, and/or other summary page attributes.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts a computing environment 1A00 in which embodiments of the present disclosure can be implemented.

The computing environment 1A00 depicts a collaboration summary generator 104 operating in a collaboration system 102 (e.g., cloud-based content management platform) to summarize collaboration activities from streams of collaboration events, according to the herein disclosed techniques. As depicted graphically in a collaboration activity funnel 106, the collaboration summary generator 104 transforms a set (e.g., stream) of collaboration system interaction events 1121 from a plurality of users (e.g., user1, userK, . . . , userN) into a comprehensible presentation of a data subset (e.g., such as the shown collaboration activity summary page 1281) that is prepared for presentation (e.g., on a display of a user device) to at least one of the users (e.g., userN).

The herein disclosed techniques serve to improve user cognition of collaboration events. As shown in the example of FIG. 1A, when a triggering event (e.g., userN navigates to a particular folder) is detected from a subject user (operation 1), a set of collaboration system interaction events are collected (operation 2). The interaction events are grouped in according with some grouping criteria (operation 3). For example, the interaction events might be grouped based at least in part on certain event attributes (e.g., user identifier, content object identifier, timestamp, etc.) corresponding to the interaction events. A set of candidate summary pages that comprise various combinations of summary entries derived from the interaction event groups are generated (operation 4). Each summary entry represents (e.g., in human-readable form) the characteristics of its corresponding interaction event group. The candidate summary pages are scored to facilitate selection of a summary page to represent a summary of the then-current collaboration activity (operation 5). A particular selected high-scoring collaboration activity summary page is then delivered to the subject user (operation 6). For example, the entire contents of the collaboration activity summary page 1281 can be embedded in a workspace that is presented to the user device of userN. In some environments, the user device is a desktop computer that runs a browser or app. In some environments, the user device is a laptop computer that runs a browser or an app. In some environments, the user device is a mobile device that displays a graphical user interface a browser or an app. An app can be an app that is downloaded from an app repository, or an app can be a native application or native app that runs on any one or more of the aforementioned desktop computer or laptop computer or mobile device and is capable of presenting a graphical user interface on a display device.

An example of such a collaboration activity summary page derived from a set of collaboration system interaction events is discussed in detail as follows.

Figure 1B:
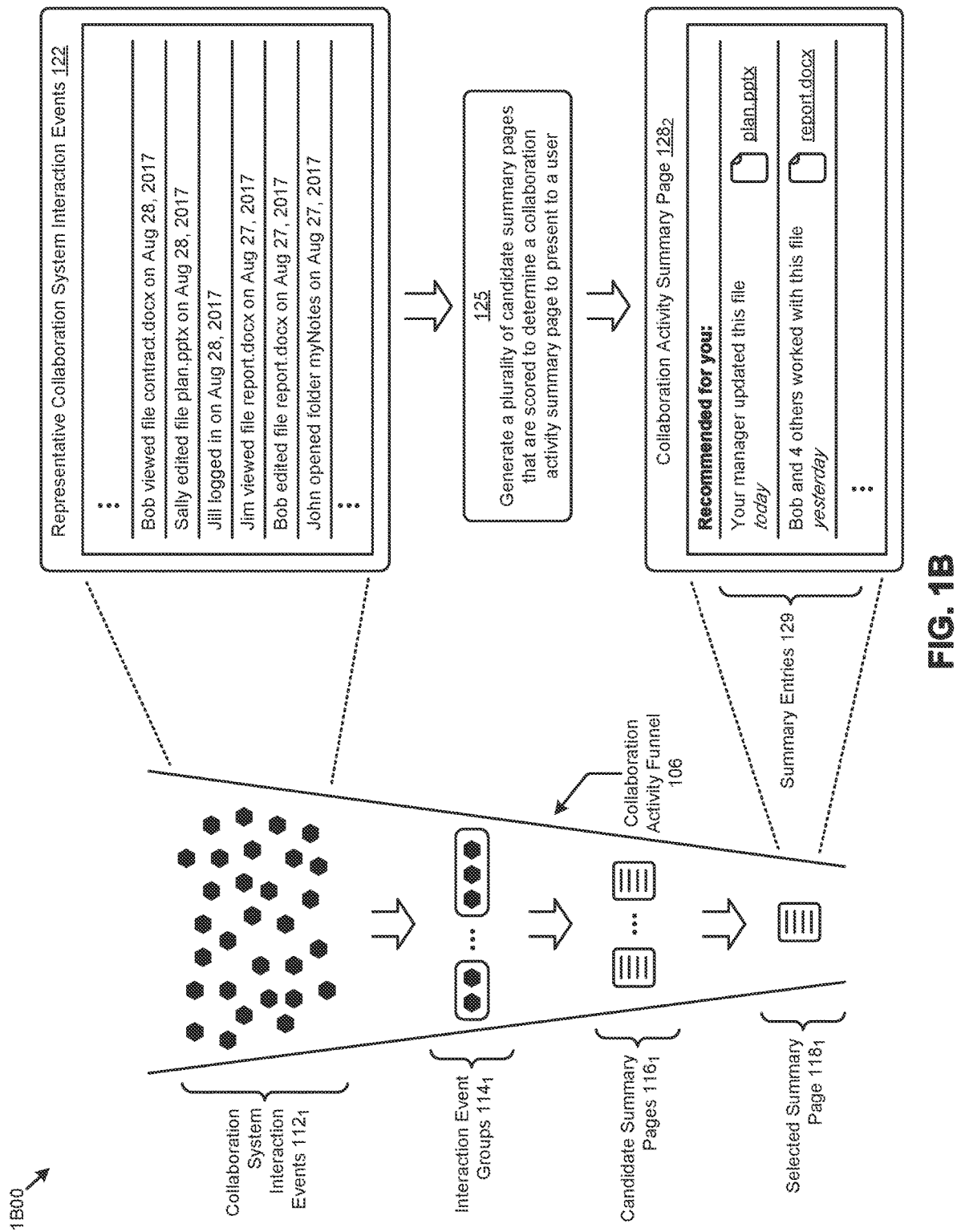
FIG. 1B illustrates a collaboration activity summarization scenario as implemented in embodiments of the present disclosure.

FIG. 1B illustrates a collaboration activity summarization scenario 1B00 as implemented in embodiments of the present disclosure. As an option, one or more variations of collaboration activity summarization scenario 1B00 or any aspect thereof may be implemented in the context of the architecture and functionality of the embodiments described herein. The collaboration activity summarization scenario 1B00 or any aspect thereof may be implemented in any environment.

The embodiment shown in FIG. 1B is merely one example of a summarization of collaboration activity as facilitated by the herein disclosed techniques. The collaboration activity funnel 106 earlier presented and discussed as pertains to FIG. 1A is presented in FIG. 1B to graphically illustrate the transformation of a stream of collaboration system interaction events 1121 into at least one selected summary page 1181 that can be used to present a cognitively comprehensible collaboration activity summary to a user (e.g., in a user's workspace). As can be observed in the embodiment of FIG. 1B, the collaboration activity funnel 106 further illustrates that a set of interaction event groups 1141 and a set of candidate data subsets of human-readable information (e.g., such as the shown candidate summary pages 1161) are generated to facilitate the aforementioned transformation from a corpus of computer representations of events into human-readable information summaries.

More specifically, the collaboration activity summarization scenario 1B00 depicts a set of representative collaboration system interaction events 122 that are associated with a set of users interacting with collaboration objects in a collaboration system. For example, representative collaboration system interaction events 122 indicate that "Bob viewed file contract.docx on Aug. 28, 2017", "Sally edited file plan.pptx on Aug. 28, 2017", and that other interaction events have occurred. If the events described in the representative collaboration system interaction events 122 were presented directly to a user, the user may experience a cognitive overload. Further, the user might not know which events are relevant for collaboration and/or engagement.

The herein disclosed techniques address the foregoing collaboration activity presentation issues by generating a plurality of candidate summary pages that are scored to determine a collaboration summary activity page that can be presented to the user (operation 125). Specifically, a collaboration activity summary page 1282 based at least in part on the selected summary page 1181 from collaboration activity funnel 106 can be generated for presentation to the user. The collaboration activity summary page 1282 summarized the many events in the representative collaboration system interaction events 122 to two summary entries 129: "Your manager updated this file (plan.pptx) today" and "Bob and 4 others worked with this file (report.docx) yesterday". In this case, the user is presented with a concise summary of collaboration activity that is deemed relevant to the user. Other events not deemed relevant (e.g., "John opened folder myNotes on Aug. 27, 2017" are not presented in the collaboration activity summary page 1282.

One embodiment of a technique for generating such a collaboration activity summary page is disclosed in further detail as follows.

Figure 2:
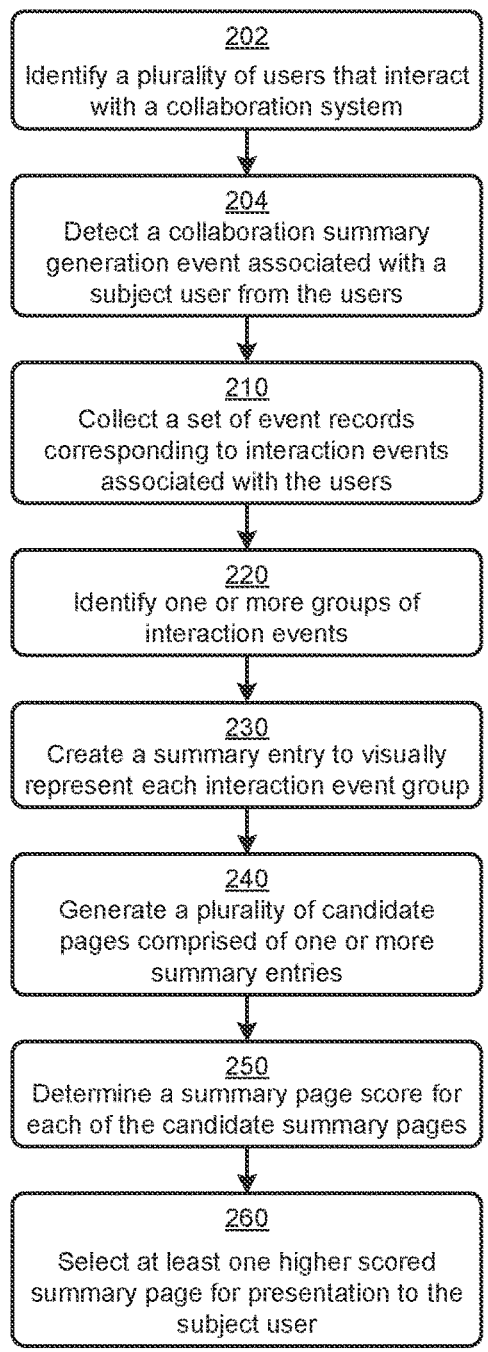
FIG. 2 presents a collaboration activity summary page generation technique, according to some embodiments.

FIG. 2 presents a collaboration activity summary page generation technique 200. As an option, one or more variations of collaboration activity summary page generation technique 200 or any aspect thereof may be implemented in the context of the architecture and functionality of the embodiments described herein. The collaboration activity summary page generation technique 200 or any aspect thereof may be implemented in any environment.

The collaboration activity summary page generation technique 200 presents one embodiment of certain steps and/or operations that generate candidate summary pages comprising summaries of grouped interaction events that are then scored to determine a most comprehensible collaboration activity summary page to present to a user. As shown, the collaboration activity summary page generation technique 200 can commence by identifying a plurality of users that interact with a collaboration system (step 202). A collaboration summary generation event invoked by a subject user from the users is detected (step 204). Responsive to detecting the collaboration summary generation event, a set of event records corresponding to interaction events associated with the users (step 210) is collected. For example, such interaction events often involve interactions (e.g., authoring, editing, viewing, sharing, commenting, etc.) by a particular user with a particular content object (e.g., text file, rich text document, video, picture, etc.) accessible at the collaboration system. The set of collected interaction events may be constrained by a certain time period (e.g., last 30 days), a certain group of users (e.g., users in the same division as the subject user), and/or other constraints.

The collected event records are analyzed to identify one or more groups of interaction events (step 220). For example, the interaction events might be grouped in accordance with certain similarities between the interaction events. A summary entry is created for each interaction event group to visually represent the group (step 230). As an example, a summary entry with the label "Bob and 4 others worked with this file (report.docx) yesterday" might summarize at least five recorded interaction events. A plurality of candidate summary pages that comprise combinations of one or more summary entries are generated (step 240). Candidate summary scores for individual ones of the plurality of candidate summary pages are determined (step 250). At least one higher (or highest) scored summary page is then presented to the subject user (step 260). For example, a scored summary page can be presented as a human-readable data subset that is laid out in a graphical user interface that comprises several ordered groupings of data and/or icons and/or other visual screen devices.

Figure 3:
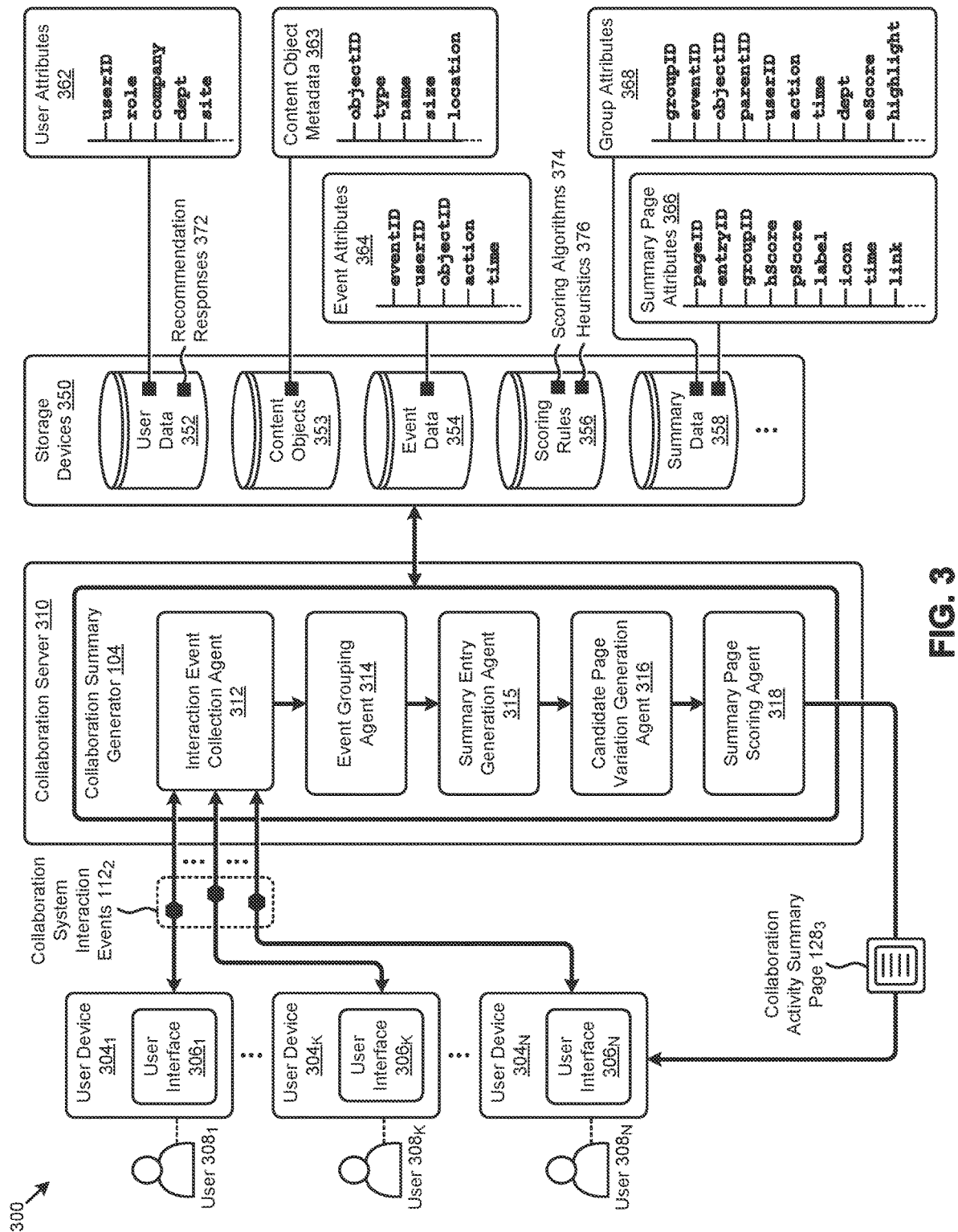
FIG. 3 depicts a computing system for summarizing collaboration activities from streams of collaboration events, according to some embodiments.

A system for implementing any of the herein disclosed techniques is disclosed as pertains to FIG. 3.

FIG. 3 depicts a computing system 300 for summarizing collaboration activities from streams of collaboration events. As an option, one or more variations of computing system 300 or any aspect thereof may be implemented in the context of the architecture and functionality of the embodiments described herein. The computing system 300 or any aspect thereof may be implemented in any environment.

The embodiment shown in FIG. 3 depicts merely one example of a computing system that supports summarization of collaboration activities from streams of collaboration events according to the herein disclosed techniques. The components, data structures, and data flows shown in FIG. 3 present one partitioning and associated data manipulation approach. The specific example shown is purely exemplary, and other subsystems, data structures, and/or partitioning are reasonable.

Specifically, the computing system 300 comprises an instance of the collaboration summary generator 104 operating at an instance of a collaboration server 310. A plurality of instances of the collaboration summary generator 104 might operate at a plurality of instances of the collaboration server 310 in a particular collaboration system. Such instances can access a set of storage devices 350 that store various information that facilitates operation of the computing system 300 and/or implementation therein of the herein disclosed techniques. For example, the collaboration server 310 might facilitate access to shared content in content objects 353 by a plurality of users (e.g., user $308_1$, ..., user $308_K$, ..., user $308_N$) from a respective set of user devices (e.g., user device $304_1$, ..., user device $304_K$, ..., user device $304_N$). In some cases, the users can interact with user interfaces (e.g., user interface $306_1$, ..., user interface $306_K$, ..., user interface $306_N$) at the user devices to invoke certain collaboration system interaction events $112_2$ (e.g., request access to content objects 353) at the computing system 300.

In accordance with the techniques discussed herein, an interaction event collection agent 312 at the collaboration summary generator 104 can detect such collaboration system interaction events. The interaction event collection agent 312 can codify certain event attributes 364 pertaining to the collaboration system interaction events $112_2$ in a set of event data 354 stored in the storage devices 350. In some cases, interaction event collection agent 312 will access a set of user attributes 362 stored in user data 352 and/or a set of content object metadata 363 stored in content objects 353 to facilitate populating the event data 354.

Further details regarding general approaches to collecting and managing streams of collaboration events are described in U.S. Application Ser. No. 62/539,341 titled "FORMING EVENT-BASED RECOMMENDATIONS", filed on Jul. 31, 2017, which is hereby incorporated by reference in its entirety.

The user attributes 362, content object metadata 363, event data 354, and/or any other data described herein can be organized and/or stored using various techniques. For example, the user attributes 362 associated with user data 352 indicate that the user information might be organized and/or stored in a tabular structure (e.g., relational database table) that has rows that relate various user attributes with a particular user. As another example, the information might be organized and/or stored in a programming code object that has instances corresponding to a particular user and properties corresponding to the various attributes associated with the user.

As depicted in user attributes 362, a data record (e.g., table row or object instance) for a particular user might describe a user identifier (e.g., stored in a "userID" field), a role identifier (e.g., stored in a "role" field), a company identifier (e.g., stored in a "company" field), a department identifier (e.g., stored in a "dept" field), a site identifier (e.g., stored in a "site" field), and/or other user attributes. Further, a data record (e.g., table row or object instance) in the content object metadata 363 might relate content objects described by an object identifier (e.g., stored in an "objectID" field) with an object type description (e.g., stored in a "type" field), an object name (e.g., stored in a "name" field), an object size (e.g., stored in a "size" field), an object location indicator (e.g., a URL stored in a "location" field), and/or other content attributes. The event data 354 formed by the interaction event collection agent 312 from the foregoing information will comprise data records (e.g., table rows or object instances) that each relate an event described by an event identifier (e.g., stored in an "eventID" field) with a user identifier (e.g., stored in a "userID" field), an object identifier (e.g., stored in an "objectID" field), an interaction type description (e.g., stored in an "action" field), an event timestamp (e.g., stored in a "time" field), and/or other event attributes.

An event grouping agent 314 at the collaboration summary generator 104 can access the event data 354 to identify one or more groups of interaction events. In certain embodiments, the interaction event grouping can be influenced by how a particular user (e.g., user $308_N$) may have responded to earlier collaboration and/or engagement recommendations. For example, a set of recommendation responses 372 stored in user data 352 can be accessed to determine the response of a particular user to earlier recommendations. The interaction event groups identified are stored in a specialized data structure as a set of summary data 358. Specifically, and as depicted in group attributes 368, such a specialized data structure can comprise data records (e.g., table rows or object instances) that each relate a group described by a group identifier (e.g., stored in an "groupID" field) with an event identifier (e.g., stored in an "eventID" field), an object identifier (e.g., stored in an "objectID" field), an object parent identifier (e.g., a folder or directory identifier stored in a "parentID" field), a user identifier (e.g., stored in a "userID" field), an interaction type description (e.g., stored in an "action" field), an event timestamp (e.g., stored in a "time" field), a department identifier (e.g., stored in a "dept" field), an event score value (e.g., stored in an "eScore" field), an event highlight indicator (e.g., stored in a "highlight" field), and/or other group attributes.

A summary entry generation agent 315 creates the summary entries that represent each of the interaction event groups. A candidate page variation generation agent 316 generates the candidate summary pages that comprise combinations of one or more of the aforementioned summary entries. The summary pages that are generated can be stored in a specialized data structure as summary data 358. Specifically, and as depicted in the summary page attributes 366, the specialized data structure can comprise data records (e.g., table rows or object instances) that each relate a summary page described by a page identifier (e.g., stored in an "pageID" field) with a summary entry identifier (e.g., stored in an "entryID" field), a group identifier (e.g., stored in an "groupID" field), a heuristic score value (e.g., stored in an "hScore" field), a summary page score value (e.g., stored in a "pScore" field), a summary entry label (e.g., stored in a "label" field), a summary entry icon (e.g., stored in an "icon" field), and summary entry time indicator (e.g., stored in a "time" field), a summary entry hyperlink (e.g., stored in a "link" field), and/or other summary page attributes. In some embodiments, the "eScore" and/or "hScore" might be calculated at the summary entry generation agent 315 and/or the candidate page variation generation agent 316. For example, the candidate page variation generation agent 316 might access a set of heuristics 376 in the scoring rules 356 to calculate heuristic scores for one or more candidate summary pages.

In other embodiments, the "eScore", the "hScore", and/or the "pScore" are calculated by a summary page scoring agent 318 at the collaboration summary generator 104. Specifically, the summary page scoring agent 318 scores the candidate summary pages to facilitate selection of at least one summary page to present as a collaboration activity summary page $128_3$ to a subject user (e.g., user $308_N$). The summary page scoring agent 318 might access certain instances of scoring algorithms 374, heuristics 376, recommendation responses 372, and/or other information to facilitate determining the summary page scores for the candidate summary pages.

The foregoing discussions include techniques for identifying groups of interaction events (e.g., step 220 of FIG. 2), which techniques are disclosed in further detail as follows.

Figure 4:
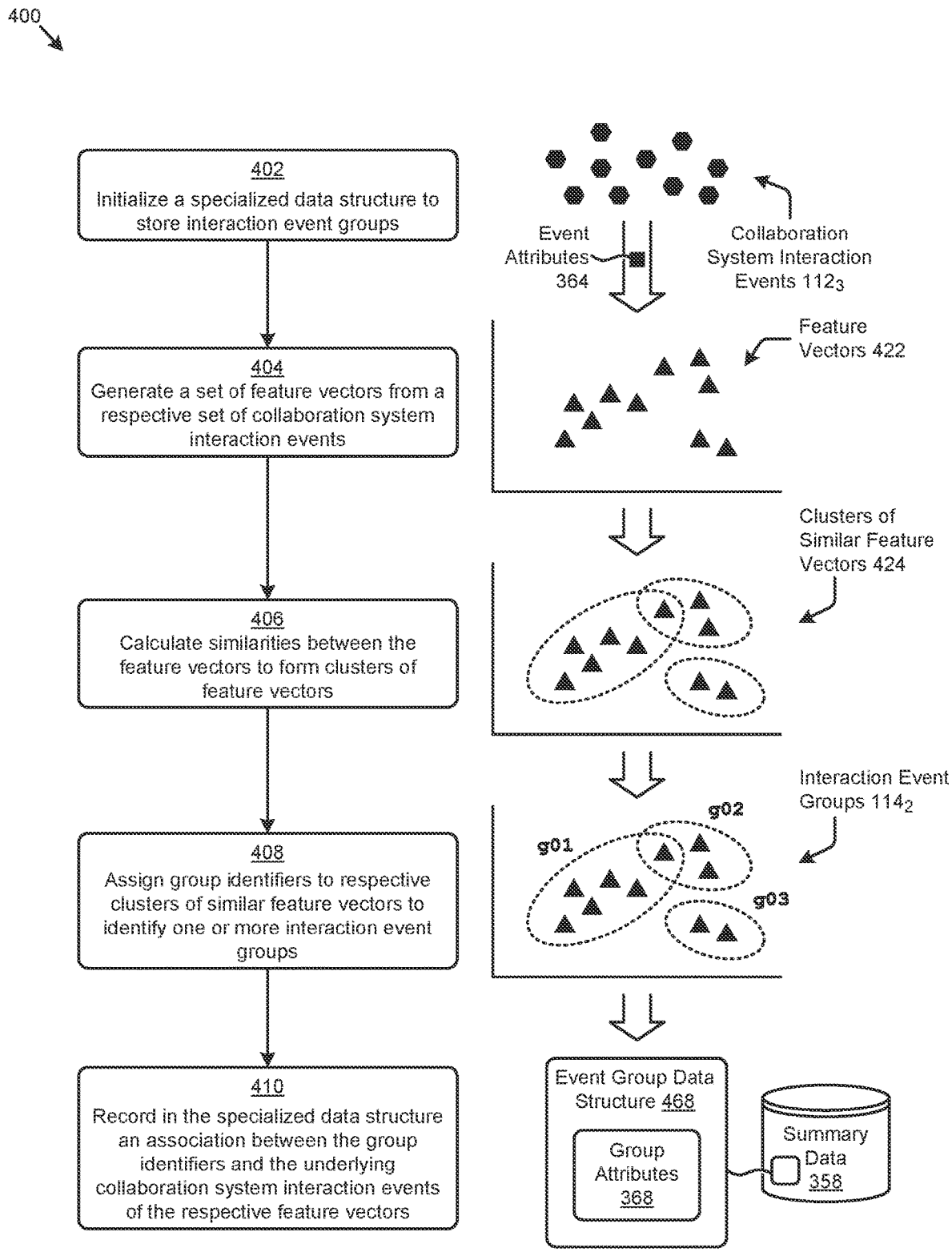
FIG. 4 presents an interaction event grouping technique as implemented in systems that summarize collaboration activities from streams of collaboration events, according to an embodiment.

FIG. 4 presents an interaction event grouping technique 400 as implemented in systems that summarize collaboration activities from streams of collaboration events. As an option, one or more variations of interaction event grouping technique 400 or any aspect thereof may be implemented in the context of the architecture and functionality of the embodiments described herein. The interaction event grouping technique 400 or any aspect thereof may be implemented in any environment.

The interaction event grouping technique 400 presents one embodiment of certain steps and/or operations that identify groups of interaction events to facilitate the herein disclosed techniques. Various illustrations are also presented to illustrate the interaction event grouping technique 400. As shown, the interaction event grouping technique 400 can commence by initializing a specialized data structure to store interaction event groups (step 402). For example, space for a specialized data structure can be allocated within a storage facility. The specialized data structure can be initialized to form an event group data structure 468 that in turn can be populated and stored persistently or ephemerally in persistent or non-persistent memory. The event group data structure 468 can be organized in any shape or hierarchy so as to store any forms or representations of group attributes 368 such as were earlier presented and described as pertains to FIG. 3.

A set of feature vectors are generated from a respective set of collaboration system interaction events (step 404). As illustrated, for example, the feature vectors 422 might be formed from the collaboration system interaction events $112_3$. More specifically, each one of the feature vectors 422 will correspond to a respective one of the collaboration system interaction events $112_3$ and comprise a respective portion of the event attributes 364 associated with the particular event. The portion of the event attributes 364 serve as the "features" of the feature vector. Similarities between the feature vectors are calculated to form one or more clusters of feature vectors (step 406). For example, a set of clusters of similar feature vectors 424 can be formed from the feature vectors 422. Any known clustering technique can be applied to from the clusters.

The one or more clusters of similar feature vectors are assigned group identifiers to identify a respective one or more interaction event groups (step 408). As shown, the clusters of similar feature vectors 424 are assigned group identifiers (e.g., "g01", "g02", and "g03") to identify a respective set of interaction event groups 1142. The illustrated example indicates that clusters and corresponding interaction event groups can overlap (e.g., share one or more common feature vectors or underlying events). An association between the group identifiers and the underlying collaboration system interaction events of the respective feature vectors (e.g., in each group or cluster) is recorded in the specialized data structure (step 410). As discussed as pertains to FIG. 3, for example, a group identifier (e.g., stored in a "groupID" field) and an event identifier (e.g., stored in an "eventID" field) included in group attributes 368 can be associated in each data record (e.g., table row or object instance) stored in the event group data structure 468. In some cases (e.g., more computing resources and/or time are available), the generation of more interaction event groups might be performed. Such additional groups might be generated from an additional set of collaboration system interaction events (e.g., from an earlier historical period) or from a re-application of a clustering technique (e.g., a different clustering technique, the same clustering technique with different constraints, etc.).

Further details regarding general approaches to generating relationships and/or user-oriented networks between sets of collaboration system interaction events are described in U.S. Application Ser. No. 62/539,367 titled "SPONTANE- OUS NETWORKING", filed on Jul. 31, 2017, which is hereby incorporated by reference in its entirety.

The foregoing discussions include techniques for creating summary entries to represent interaction event groups (e.g., step 230 of FIG. 2), which techniques are disclosed in further detail as follows.

FIG. 5 depicts a summary entry creation technique 500 as implemented in systems that summarize collaboration activities from streams of collaboration events. As an option, one or more variations of summary entry creation technique 500 or any aspect thereof may be implemented in the context of the architecture and functionality of the embodiments described herein. The summary entry creation technique 500 or any aspect thereof may be implemented in any environment.

The summary entry creation technique 500 presents one embodiment of certain steps and/or operations that create summary entries to represent interaction event groups according to the herein disclosed techniques. Various illustrations are also presented to illustrate the summary entry creation technique 500. As shown, the summary entry creation technique 500 can commence by accessing a specialized data structure that stores interaction event groups (step 502). For example, a set of data describing certain interaction event groups (e.g., represented by selected interaction event group data 5681) that is stored in the event group data structure 468 of summary data 358 can be accessed. The remaining steps and/or operations of summary entry creation technique 500 are performed for each interaction event group described in the accessed data. Specifically, event scores are assigned to each interaction event in the interaction event group (step 504). As can observed in the shown example, a set of event scores 524 are calculated and stored in an "eScore" field of the event group data structure 468. In this case, the event score corresponds to the interaction type (e.g., stored in an "action" field) of the event (e.g., "comment"="10", "edit"="20", and "view"="5"). Other event scoring techniques are possible.

A highlighted interaction event for the interaction event group is identified based at least in part on the event scores (step 506). A highlighted interaction event 526 (e.g., event "e23") for group "g02" in the selected interaction event group data 5681 is selected due to that particular event having the highest event score (e.g., "20") of the interaction events in the group. The highlighted interaction event is used to determine a label for a summary entry that corresponds to the interaction event group (e.g., group "g02") that comprises the highlight interaction event (step 508). For example, the attributes of highlighted interaction event 526 from the event group data structure 468 are consulted to form a label 529 of a summary entry 5281. Other attributes of the summary entry are determined from the collection of interaction events that comprise the interaction event group (step 510). Specifically, label 529 and/or the other attributes of summary entry 5281 might be derived from the "userID" (e.g., user "u14" and two others), the "objectID" (e.g., file "fileA"), and the "action" (e.g., "comment", "edit", and "view" abstracted to "worked") of the selected interaction event group data 5681, and from other group attributes (e.g., event timestamps, content object location, etc.) not shown in the selected interaction event group data 5681, but that can be available in the event group data structure 468 as earlier described (e.g., in group attributes 368 of FIG. 3).

The foregoing discussions include techniques for generating candidate summary pages that comprise combinations of summary entries (e.g., step 240 of FIG. 2), some of which techniques are disclosed in further detail as follows.

Figure 6A:
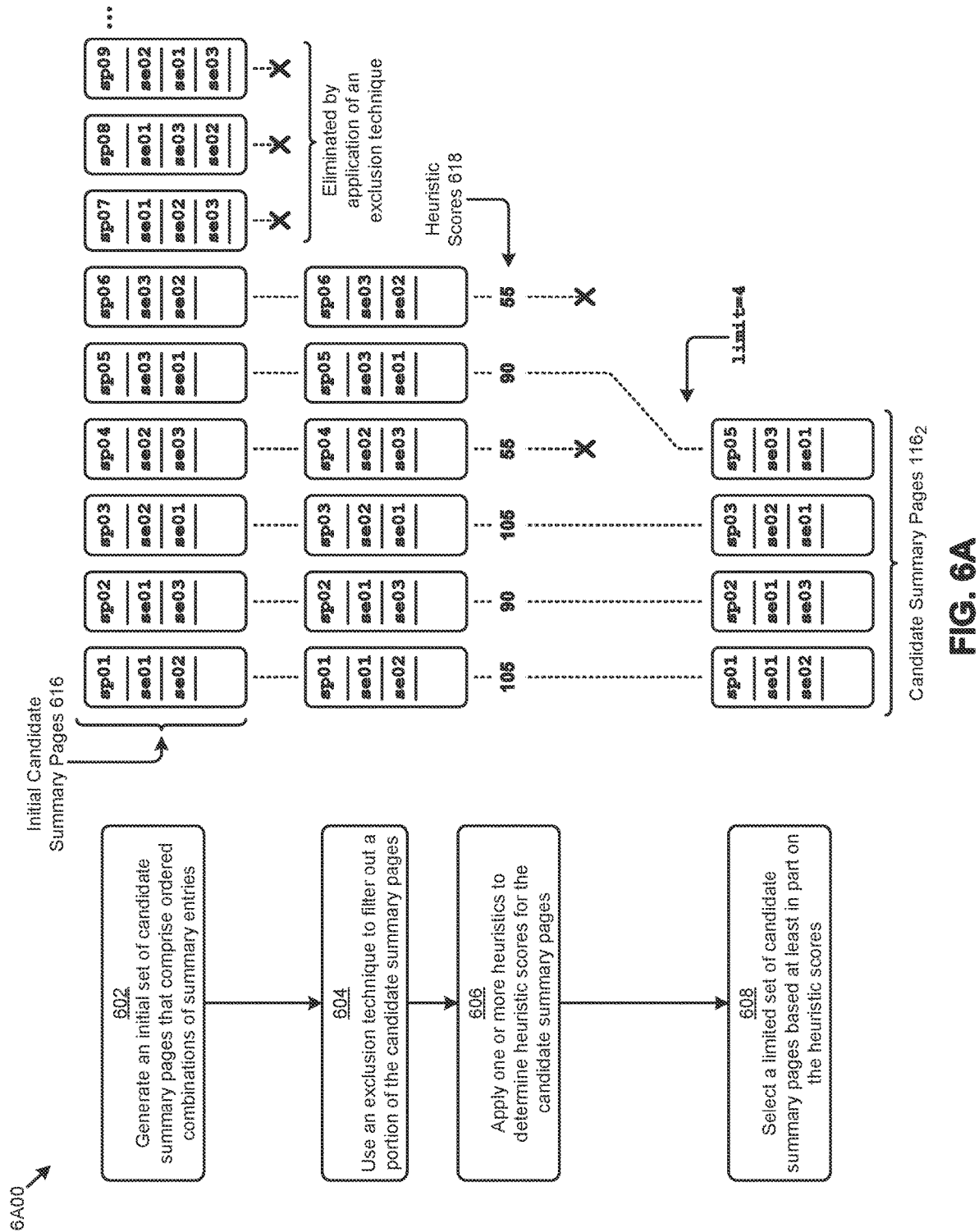
FIG. 6A depicts a candidate summary page generation technique as implemented in systems that summarize collaboration activities from streams of collaboration events, according to an embodiment.

FIG. 6A depicts a candidate summary page generation technique 6A00 as implemented in systems that summarize collaboration activities from streams of collaboration events. As an option, one or more variations of candidate summary page generation technique 6A00 or any aspect thereof may be implemented in the context of the architecture and functionality of the embodiments described herein. The candidate summary page generation technique 6A00 or any aspect thereof may be implemented in any environment.

The candidate summary page generation technique 6A00 presents one embodiment of certain steps and/or operations that generate candidate summary pages to facilitate implementation of the herein disclosed techniques. Various illustrations are also presented to illustrate the candidate summary page generation technique 6A00. As shown, the candidate summary page generation technique 6A00 can commence by generating an initial set of candidate summary pages that comprise ordered combinations of summary entries (step 602). Illustrated in FIG. 6A is a representative portion of initial candidate summary pages 616 (e.g., "sp01", "sp02", "sp03", . . . ) that comprise various combinations of three summary entries (e.g., "se01", "se02", and "se03"). An exclusion technique is applied to filter out a portion of the initial candidate summary pages (step 604). As shown, applying an exclusion technique to the initial candidate summary pages 616 results in a set of six candidate summary pages (e.g., "sp01", "sp02", "sp03", "sp04", "sp05", and "sp06") that remain for consideration. As an example, the exclusion technique might filter out any candidate summary pages that have more or less than two summary entries. Other exclusion techniques (e.g., rules, constraints, etc.) are possible.

One or more heuristics are applied to the then-current set of candidate summary pages to determine heuristic scores for the candidate summary pages (step 606). In certain embodiments, heuristics are applied to manage the amount of computing resources consumed when generating collaboration activity summaries in accordance with the herein disclosed techniques. Various heuristics can be implemented in accordance with various objectives. The heuristics can be designed to produce a higher heuristic score for a particular candidate summary page when the attributes of the candidate summary page are closer to the corresponding objective. For example, heuristics might be designed to rank candidate summary pages based at least in part on the actions of the interaction events summarized in the pages, the users of the interaction events summarized in the pages, and/or any other combination of event attributes associated with the pages. In the example shown in FIG. 6A, the heuristic scores 618 represent the scores resulting from applying an action-dominant heuristic (e.g., a heuristic that emphasizes the actions of the interaction events summarized in the summary pages). These heuristic scores can then be used to select a limited set of candidate summary pages (step 608). For example, the candidate summary pages 1162 are selected based on applying a limit (e.g., "limit=4") that constrains the number of pages to four.

The foregoing discussion of FIG. 6A references heuristic scoring techniques that are designed in accordance with various objectives. Scenarios that illustrate respective examples of such heuristic scoring techniques are disclosed as follows.

FIG. 6B1, FIG. 6B2, and FIG. 6B3 present candidate summary page heuristic scoring scenarios as implemented in systems that summarize collaboration activities from streams of collaboration events. As an option, one or more variations of the candidate summary page selection scenarios or any aspect thereof may be implemented in the context of the architecture and functionality of the embodiments described herein. The candidate summary page selection scenarios or any aspect thereof may be implemented in any environment.

FIG. 6B1 presents an action-dominant heuristic scoring scenario 6B100. The heuristics applied in the action-dominant heuristic scoring scenario 6B100 are designed to produce heuristic scores for candidate summary pages based at least in part on the actions associated with the interaction events summarized in the summary pages. An action-dominant heuristic, for example, might attribute to a heuristic score a higher value (e.g., 20) for an "edit" interaction event, attribute a lower value (e.g., 10) for a "comment" interaction event, and attribute an even lower value (e.g., 5) for a "view" interaction event. As can be observed in action-dominant heuristic scoring scenario 6B100, the event scores (e.g., stored in an "eScore" field) of the interaction events comprising the selected interaction event group data $568_2$ are established in accordance with the action associated with the interaction events.

In this case, applying an action-dominant heuristic to determine heuristic scores for a set of candidate summary pages (operation 610) is accomplished by relating the event scores of the interaction events to the respective candidate summary pages that are associated with the events. Specifically, the selected summary page data 6421 relates selected candidate summary pages (e.g., "sp01", "sp02", "sp03", "sp04", "sp05", and "sp06") with the heuristic scores (e.g., stored in an "hScore" field) of the interaction event groups represented (e.g., by summary entries) in the summary pages. As an example, the selected summary page data 6421 indicates that candidate summary page "sp01" comprises summary entries "se01" and "se02", which represent interaction event groups "g01" and "g02". The heuristic scores corresponding to "g01" and "g02" are "70" and "35", respectively, which correspond to the sum of the event scores of the underlying interaction events of the groups as depicted in the selected interaction event group data $568_2$. The heuristic scores for each candidate summary page are summed to produce the summary page heuristic scores 6441.

FIG. 6B2 presents a user-dominant heuristic scoring scenario 6B200. The heuristics applied in the user-dominant heuristic scoring scenario 6B200 are designed to produce heuristic scores for candidate summary pages based at least in part on the users associated with the interaction events summarized in the summary pages. A user-dominant heuristic, for example, might attribute a higher value for an interaction event invoked by a CEO of an enterprise, and attribute a lower value for an interaction event invoked by a junior individual contributor of the enterprise. Another user-dominant heuristic might attribute a higher value for interaction events invoked by users in the same department as a subject user, and attribute a lower value for interaction events invoked by users outside of the department. For the user-dominant heuristic scoring scenario 6B200, a value of 20 is attributed to a heuristic score for user "u01" and user "u05"; a value of 10 is attributed to a heuristic score for user "u14"; and a value of 5 is attributed to a heuristic score for user "u83".

In this case, applying a user-dominant heuristic to determine heuristic scores for a set of candidate summary pages (operation 620) is accomplished by relating the foregoing user attribution values of the interaction events to the respective candidate summary pages that are associated with the events. Specifically, the selected summary page data $642_2$ relates selected candidate summary pages (e.g., "sp01", "s02" "s03" "s04" "s05" and "sp06") with the heuristic scores (e.g., stored in an "hScore" field) of the interaction event groups represented (e.g., by summary entries) in the summary pages. As an example, the selected summary page data $642_2$ indicates that candidate summary page "sp02" comprises summary entries "se01" and "se03", which represent interaction event groups "g01" and "g03". The heuristic scores corresponding to "g01" and "g03" are "30" and "40", respectively, which correspond to the sum of the user attribution values of the underlying interaction events of the groups as depicted in the selected interaction event group data $568_2$. The heuristic scores for each candidate summary page are summed to produce the summary page heuristic scores $644_2$.

FIG. 6B3 presents a user-folder-dominant heuristic scoring scenario 6B300. The heuristics applied in the user-folder-dominant heuristic scoring scenario 6B300 are designed to produce heuristic scores for candidate summary pages based at least in part on the users and/or the folders associated with the interaction events summarized in the summary pages. A user-folder-dominant heuristic, for example, might attribute to a heuristic score a higher value for a set of interaction events that involve a particular folder accessed by many different users, and attribute a lower value for a set of interaction events that involve a particular folder accessed by a single user. For the user-folder-dominant heuristic scoring scenario 6B300, a value of 10 is attributed to a heuristic score for each unique combination of user and folder in a given set of interaction events.

In this case, applying a user-folder-dominant heuristic to determine heuristic scores for a set of candidate summary pages (operation 630) is accomplished by relating the foregoing user-folder combination attribution values of the interaction events to the respective candidate summary pages that are associated with the events. Specifically, the selected summary page data $642_3$ relates selected candidate summary pages (e.g., "sp01", "sp02", "sp03", "sp04", "sp05", and "sp06") with the heuristic scores (e.g., stored in an "hScore" field) of the interaction event groups represented (e.g., by summary entries) in the summary pages. As an example, the selected summary page data $642_3$ indicates that candidate summary page "sp03" comprises summary entries "se02" and "se01" which represent interaction event groups "g02" and "g01". The heuristic scores corresponding to "g02" and "g01" are "30" and "10", respectively, which correspond to the number of unique user-folder combinations in the underlying interaction events of the groups as depicted in the selected interaction event group data $568_2$. The heuristic scores for each candidate summary page are summed to produce the summary page heuristic scores $644_3$.

The foregoing discussions include techniques for determining summary page scores for candidate summary pages (e.g., step 250 of FIG. 2), which techniques are disclosed in further detail as follows.

Figure 7:
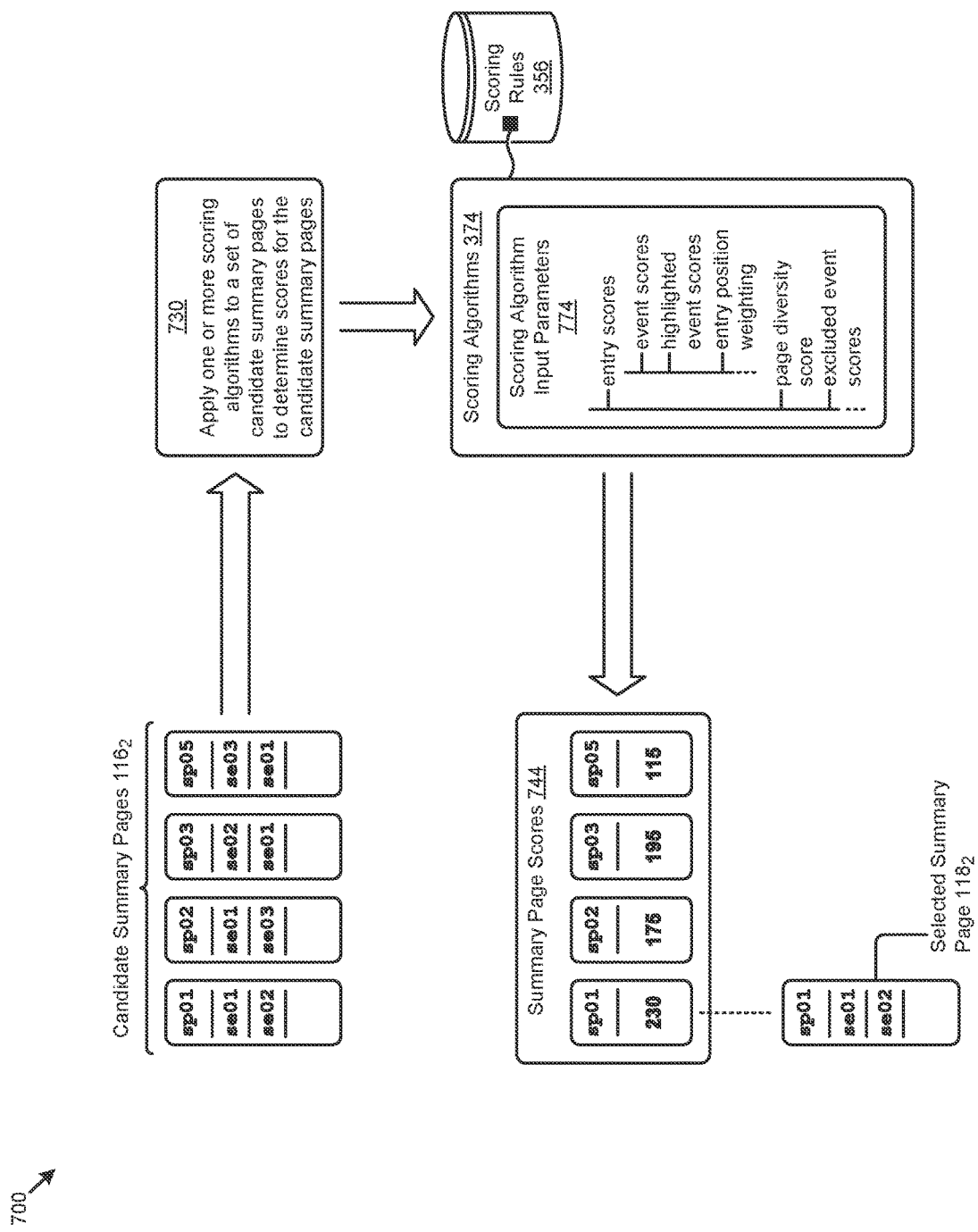
FIG. 7 illustrates a candidate summary page scoring technique as implemented in systems that summarize collaboration activities from streams of collaboration events, according to an embodiment.

FIG. 7 illustrates a candidate summary page scoring technique 700 as implemented in systems that summarize collaboration activities from streams of collaboration events. As an option, one or more variations of candidate summary page scoring technique 700 or any aspect thereof may be implemented in the context of the architecture and functionality of the embodiments described herein. The candidate summary page scoring technique 700 or any aspect thereof may be implemented in any environment.

The candidate summary page scoring technique 700 depicted in FIG. 7 illustrates one example embodiment of a technique for applying one or more scoring algorithms to a set of candidate summary pages to determine summary page scores for the candidate summary pages (operation 730). Specifically, the embodiment depicts scoring algorithms 374 from scoring rules 356 applied to the candidate summary pages $116_2$ (e.g., "sp01", "sp02", "sp03", and "sp05") earlier described. The scoring algorithms 374 can consume any number and type of input parameters that it manipulates to produce its outputs (e.g., summary page scores). As described in a set of scoring algorithm input parameters 774, for example, the scoring algorithm might receive inputs corresponding to one or more summary entry scores (e.g., "entry scores") for the summary entries in a particular summary page, which summary entry scores are each derived from the scores of underlying interaction events (e.g., "event scores"). Highlighted interaction events (e.g., "highlighted event score"), and a weighting associated with a determined position of the summary entry in the summary page (e.g., "entry position weighting") can also be calculated and used in a scoring algorithm. As shown, the scoring algorithm might also receive inputs corresponding to a measure of diversity of the summary page (e.g., "page diversity score"), a (negative) measure of the interaction events excluded from the summary page (e.g., "excluded event scores"), and/or other input parameters.

The following equation is one example embodiment of a scoring algorithm for determining a summary page score (SPS) for a candidate summary page.

$$SPS = \sum_{g \in page} GS_g + DS - \sum_{x \notin page} ES_x \quad (EQ. 1)$$

where:
$GS_g$=the group score for a group (e.g., summary entry) associated with the candidate summary page,
DS=the diversity score of the candidate summary page, and
$ES_x$=the event score for an interaction event excluded from the candidate summary page.

The group score ($GS_g$) can further be expressed by:

$$GS(group) = W_p \cdot (W_h + \sum_{e \in group} ES_e) \quad (EQ. 2)$$

Where:
$W_p$=the position weighting of the group (e.g., summary entry),
$W_h$=the highlight weighting of an interaction event, and
$ESe$=the event score for an interaction event included in the group.

Applying the foregoing equations to the example candidate summary pages and associated interaction event group data described herein results in the summary page scores 744 shown in FIG. 7, which scores are used to form scored data subsets (e.g., scored candidate summary pages). The numeric scores of the scored data subsets can be consulted to select the highest scored occurrences of the scored data subsets (e.g., see candidate summary page "sp01" with a score of "230"). One or more of the highest scored occurrences of the scored data subsets are selected to be presented as the selected summary page 1182. In cases where there are multiple highest scored data subsets (e.g., multiple scored candidate summary pages), then either a subset of the multiple highest scored data subsets or all of the multiple highest scored data subsets can be formatted to be presented to the user on a display of a user device.

Additional Embodiments of the Disclosure

Additional Practical Application Examples

Figure 8:
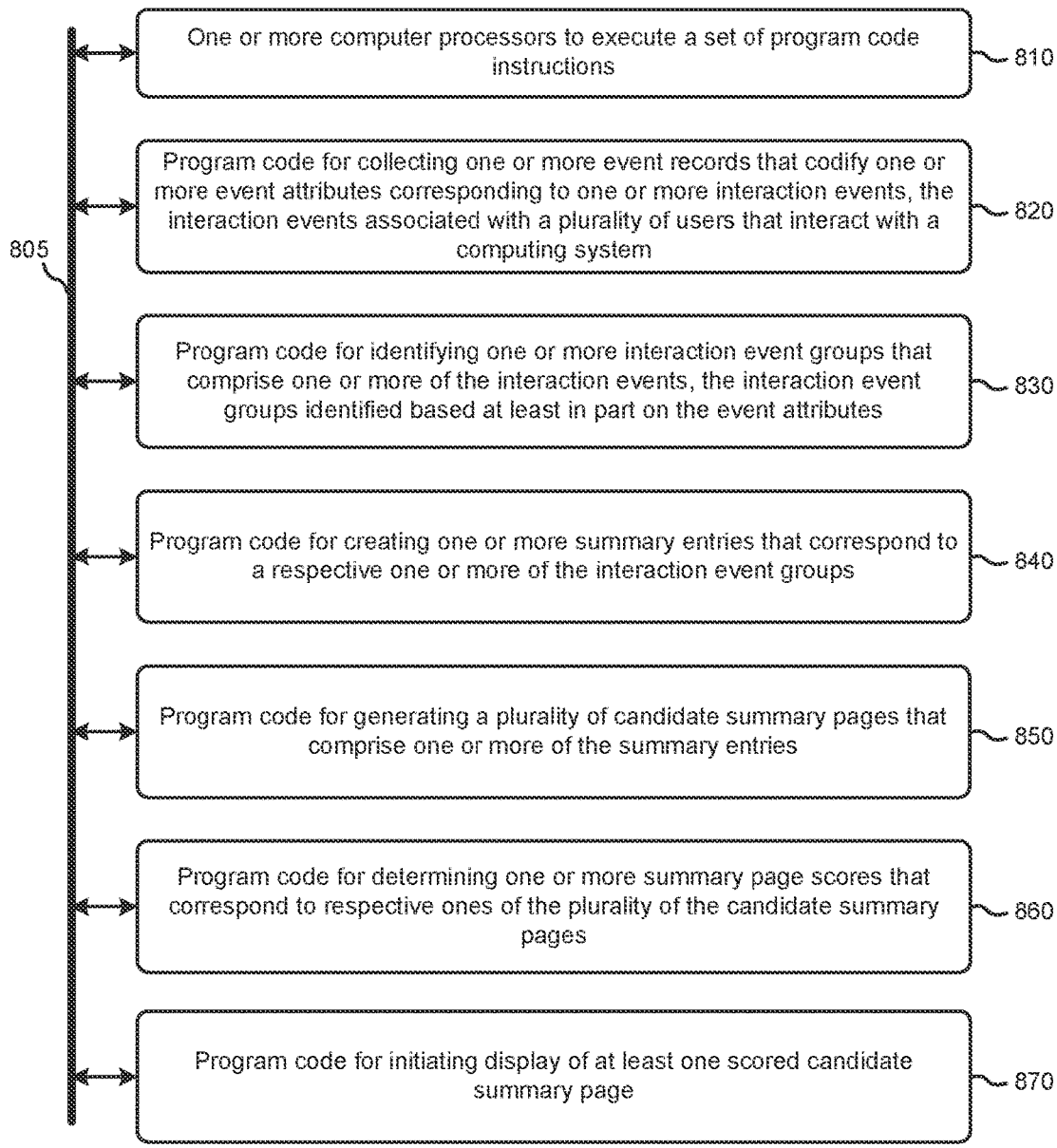
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address how to construct a comprehensible summary page from streams of collaboration activity records. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: collecting one or more event records that codify one or more event attributes corresponding to one or more interaction events, the interaction events associated with a plurality of users that interact with a computing system (module 820); identifying one or more interaction event groups that comprise one or more of the interaction events, the interaction event groups identified based at least in part on the event attributes (module 830); creating one or more summary entries that correspond to a respective one or more of the interaction event groups (module 840); generating a plurality of candidate summary pages that comprise one or more of the summary entries (module 850); determining one or more summary page scores that correspond to respective ones of the plurality of the candidate summary pages (module 860), and initiating display of at least one scored candidate summary page (module 870).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 9A:
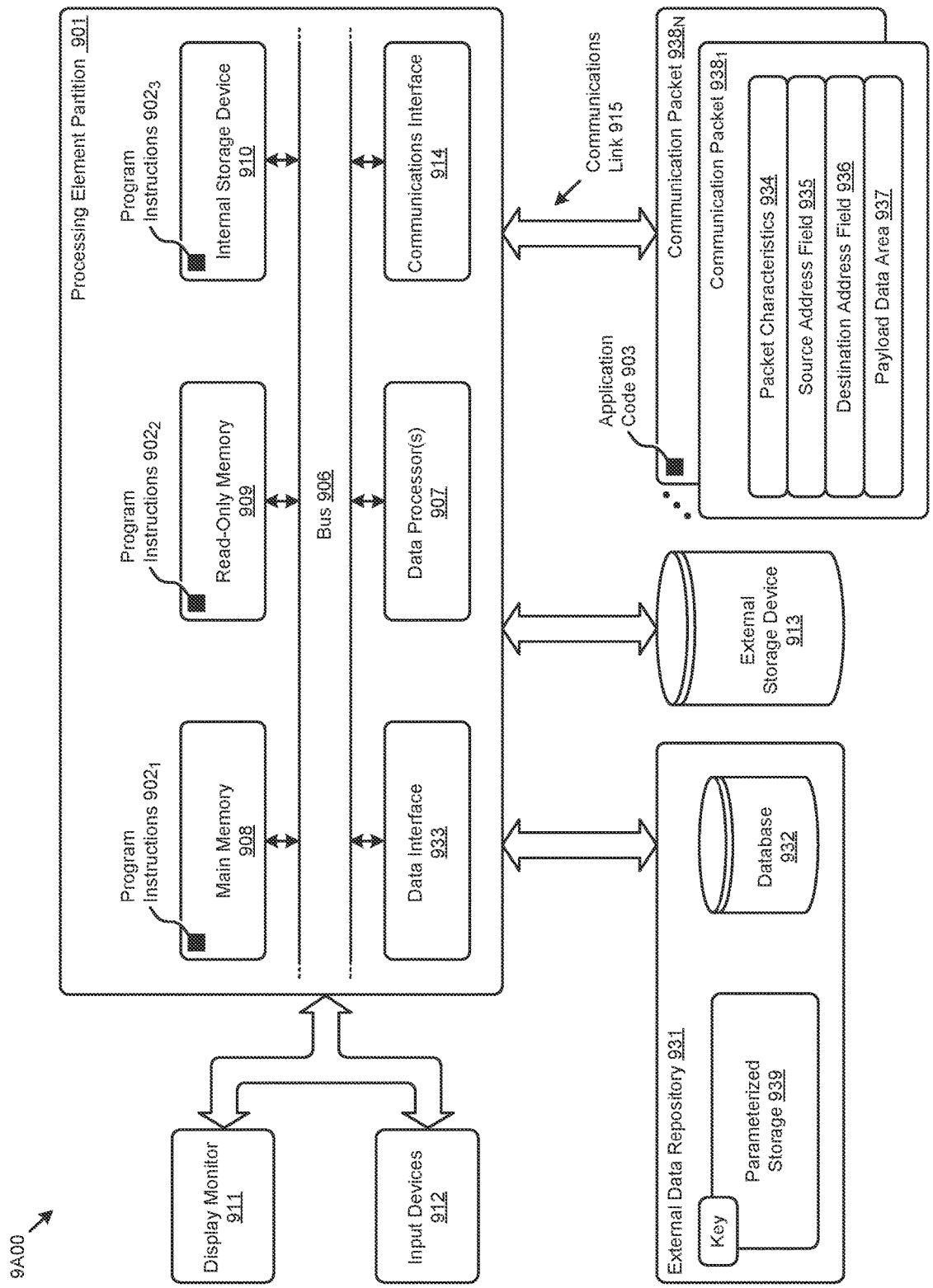
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to summarizing collaboration activities from streams of collaboration events. A module may include one or more state machines and/or combinational logic used to implement or facilitate the operational and/or performance characteristics pertaining to summarizing collaboration activities from streams of collaboration events.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of summarizing collaboration activities from streams of collaboration events). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to summarizing collaboration activities from streams of collaboration events, and/or for improving the way data is manipulated when performing computerized operations pertaining to generating candidate summary pages comprising summaries of grouped interaction events that are then scored to determine a most comprehensible interaction activity summary page to present to a user.

Figure 9B:
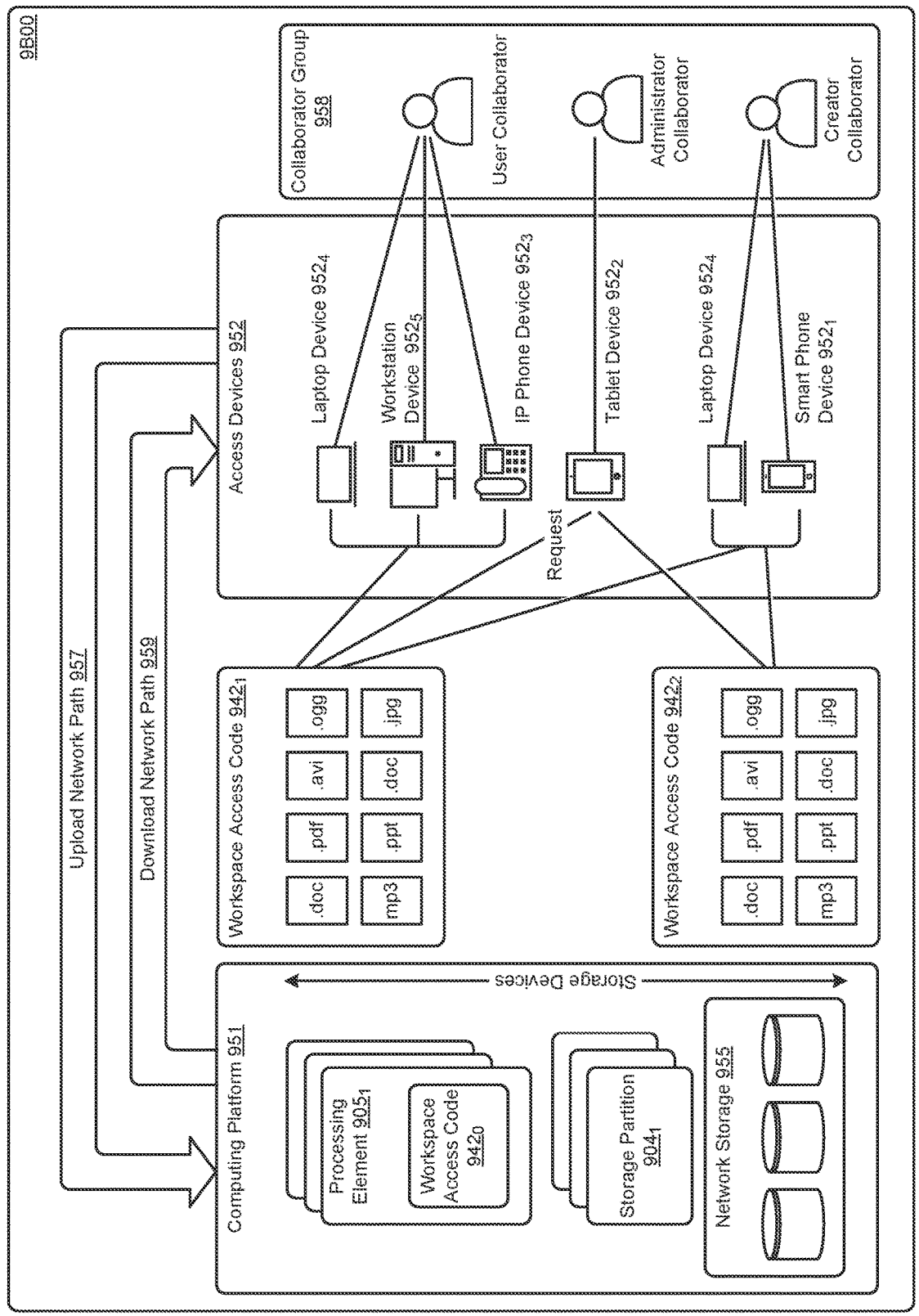

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
   collecting event records characterizing interaction events pertaining to interactions of multiple users with multiple collaboration objects at different timepoints in a collaboration system; and
   summarizing the event records into a final summary page at least by:
      determining, for the interactions, one or more groups for summarizing the event records at least by:
         determining, based at least part upon the event records, a feature for an interaction event by using a portion of a plurality of event attributes for the interaction event of the interaction events;
         representing the interaction event as a feature vector based at least in part upon the feature; and
         determining the one or more groups based at least in part upon the feature vector;
      generating multiple summary candidate pages for the multiple collaboration objects at least by determining a respective combination of multiple summary entries, which are derived from the one or more groups, for a summary candidate page of the multiple summary candidate pages, wherein
         at least one summary candidate page of the multiple summary candidate pages comprises summary entries for the multiple collaboration objects; and
      determining the final summary page from the multiple summary candidate pages based at least in part upon respective scores of the multiple summary candidate pages.

2. The method of claim 1, further comprising:
   determining the plurality of event attributes for the interaction events; and
   identifying the portion of the plurality of event attributes for the interaction event, wherein
      the summary entries for the multiple collaboration objects comprise a first summary entry for a first collaboration object and a second summary entry for a second collaboration object of the multiple collaboration objects.

3. The method of claim 2, further comprising:
   generating a feature portion of the interaction event based at least in part upon the portion of the plurality of event attributes, wherein the portion of the plurality of event attributes pertains to the interaction event; and
   generating a feature vector portion for the feature vector for the interaction event based at least in part upon the feature portion that pertains to the interaction event.

4. The method of claim 1, further comprising:
   generating a respective feature vector for each interaction event of the interaction events, generating the respective feature vector comprising:
      generating a respective feature portion of the each interaction event based at least in part upon a respective portion of the plurality of event attributes, wherein the respective portion of the plurality of event attributes pertains to the each interaction event; and generating a respective feature vector portion for the respective feature vector for the each interaction event based at least in part upon the respective feature portion that pertains to the interaction event.

5. The method of claim 1, further comprising:
generating a set of feature vectors that includes the feature vector from one or more of the interaction events, wherein the feature vector comprises a feature portion that corresponds to at least one event attribute of the plurality of event attributes;
determining similarity between two or more feature vectors of the set of feature vectors;
determining a cluster of similar feature vectors based at least in part upon the similarity between the two or more feature vectors; and
assigning an identifier to the cluster of the similar feature vectors, wherein the identifier is used to identify an interaction event group.

6. The method of claim 1, further comprising:
storing the one or more groups in a data structure as a set of summary data to facilitate determining the final summary page from the multiple summary candidate pages, wherein
the data structure includes a first field storing therein an event score for the interaction event related to at least one of the one or more groups,
the data structure includes a second field storing therein a heuristic score pertaining to the at least one summary candidate page, and
the data structure includes a third field storing therein a summary page score pertaining to the final summary page.

7. The method of claim 1, wherein generating the multiple summary candidate pages further comprising:
identifying a first action performed by a first group of users of the multiple users on the multiple collaboration objects;
identifying a second action performed by a second group of users of the multiple users on the multiple collaboration objects;
generating the multiple summary entries for one or more interaction event groups of the interaction events, wherein a summary entry of the multiple summary entries includes a first description of the first action and a second description of the second action; and
determining a plurality of different combinations of summary entries from the multiple summary entries, wherein the summary candidate page of the multiple summary candidate pages corresponds to a first respective combination of the plurality of different combinations of summary entries.

8. The method of claim 1, further comprising respectively generating a heuristic score for each summary candidate page of the multiple summary candidate pages based at least in part upon action-dominant heuristic at least by:
determining a respective plurality of event scores for each collaboration object of the multiple collaboration objects;
determining a heuristic score for each combination of a first summary candidate page of the multiple summary candidate pages and a group of the one or more groups; and
determining a summary page heuristic score at least by combining one or more heuristic scores that correspond to one or more combinations each of which comprising a specific candidate summary page and the group of the one or more groups.

9. The method of claim 1, wherein determining the final summary page from the multiple summary candidate pages comprising:
identifying a corresponding summary candidate page from the multiple summary candidate pages; and
scoring the final summary page with a respective score of the respective scores of the multiple summary candidate pages based at least in part upon a separate combination of summary entries for the corresponding summary candidate page.

10. The method of claim 9, wherein the respective score is determined at least by:
respectively generating a respective summary entry score for an individual summary entry in the separate combination of the summary entries; and
combining multiple respective summary entry scores for the separate combination of the summary entries into the respective score.

11. A non-transitory computer readable medium having stored thereon a sequence of instructions which, when stored in memory and executed by one or more processors causes the one or more processors to perform a set of acts, the set of acts comprising:
collecting event records characterizing interaction events pertaining to interactions of multiple users with multiple collaboration objects at different timepoints in a collaboration system; and
summarizing the event records into a final summary page at least by:
determining, for the interactions, one or more groups for summarizing the event records at least by:
determining, based at least part upon the event records, a feature for an interaction event by using a portion of a plurality of event attributes for the interaction event of the interaction events;
representing the interaction event as a feature vector based at least in part upon the feature; and
determining the one or more groups based at least in part upon the feature vector;
generating multiple summary candidate pages for the multiple collaboration objects at least by determining a respective combination of multiple summary entries, which are derived from the one or more groups, for a summary candidate page of the multiple summary candidate pages, wherein at least one summary candidate page of the multiple summary candidate pages comprises summary entries for the multiple collaboration objects; and
determining the final summary page from the multiple summary candidate pages based at least in part upon respective scores of the multiple summary candidate pages.

12. The non-transitory computer readable medium of claim 11, the set of acts further comprising:
determining the plurality of event attributes for the interaction events; and
identifying the portion of the plurality of event attributes for the interaction event, wherein the summary entries for the multiple collaboration objects comprise a first summary entry for a first collaboration object and a second summary entry for a second collaboration object of the multiple collaboration objects.

13. The non-transitory computer readable medium of claim 12, the set of acts further comprising:
    generating a feature portion of the interaction event based at least in part upon the portion of the plurality of event attribute, wherein the portion of the plurality of event attributes pertains to the interaction event; and
    generating a feature vector portion for the feature vector for the interaction event based at least in part upon the feature portion that pertains to the interaction event.

14. The non-transitory computer readable medium of claim 11, the set of acts further comprising:
    generating a respective feature vector for each interaction event of the interaction events, generating the respective feature vector comprising:
        generating a respective feature portion of the each interaction event based at least in part upon a respective portion of the plurality of event attributes, wherein the respective portion of the plurality of event attributes pertains to the each interaction event; and
        generating a respective feature vector portion for the respective feature vector for the each interaction event based at least in part upon the respective feature portion that pertains to the interaction event.

15. The non-transitory computer readable medium of claim 11, wherein instructions for generating the multiple summary candidate pages further comprising instructions for:
    identifying a first action performed by a first group of users of the multiple users on the multiple collaboration objects;
    identifying a second action performed by a second group of users of the multiple users on the multiple collaboration objects;
    generating the multiple summary entries for one or more interaction event groups of the interaction events, wherein a first summary entry of the first multiple summary entries includes a first description of the first action and a second description of the second action; and
    determining a plurality of different combinations of summary entries from the multiple summary entries, wherein the summary candidate page of the multiple summary candidate pages corresponds to a first respective combination of the plurality of different combinations of summary entries.

16. A system, comprising:
    a non-transitory storage medium having stored thereon a sequence of instructions; and
    one or more processors that execute the sequence of instructions, wherein an execution of the sequence of instructions causes the one or more processors to perform a set of acts, the set of acts comprising,
        collecting event records characterizing interaction events pertaining to interactions of multiple users with multiple collaboration objects at different timepoints in a collaboration system; and
        summarizing the event records into a final summary page at least by:
            determining, for the interactions, one or more groups for summarizing the event records at least by:
                determining, based at least part upon the event records, a feature for an interaction event by using a portion of a plurality of event attributes for the interaction event of the interaction events;
                representing the interaction event as a feature vector based at least in part upon the feature; and
                determining the one or more groups based at least in part upon the feature vector;
            generating multiple summary candidate pages for the multiple collaboration objects at least by determining a respective combination of multiple summary entries, which are derived from the one or more groups, for a summary candidate page of the multiple summary candidate pages, wherein at least one summary candidate page of the multiple summary candidate pages comprises summary entries for the multiple collaboration objects; and
            determining the final summary page from the multiple summary candidate pages based at least in part upon respective scores of the multiple summary candidate pages.

17. The system of claim 16, the set of acts further comprising:
    determining the plurality of event attributes for the interaction events; and
    identifying the portion of the plurality of event attributes for the interaction event, wherein the summary entries for the multiple collaboration objects comprise a first summary entry for a first collaboration object and a second summary entry for a second collaboration object of the multiple collaboration objects.

18. The system of claim 17, the set of acts further comprising:
    generating a feature portion of the interaction event based at least in part upon the portion of the plurality of event attributes, wherein the portion of the plurality of event attributes pertains to the interaction event; and
    generating a feature vector portion for the feature vector for the interaction event based at least in part upon the feature portion that pertains to the interaction event.

19. The system of claim 16, the set of acts further comprising:
    generating a respective feature vector for each interaction event of the interaction events, generating the respective feature vector comprising:
        generating a respective feature portion of the each interaction event based at least in part upon a respective portion of the plurality of event attributes, wherein the respective portion of the plurality of event attributes pertains to the each interaction event; and
        generating a respective feature vector portion for the respective feature vector for the each interaction event based at least in part upon the respective feature portion that pertains to the interaction event.

20. The system of claim 16, wherein generating the multiple summary candidate pages further comprising:
    identifying a first action performed by a first group of users of the multiple users on the multiple collaboration objects;
    identifying a second action performed by a second group of users of the multiple users on the multiple collaboration objects;
    generating the multiple summary entries for one or more interaction event groups of the interaction events, wherein a summary entry of the multiple summary entries includes a first description of the first action and a second description of the second action; and determining a plurality of different combinations of summary entries from the multiple summary entries, wherein the summary candidate page of the multiple summary candidate pages corresponds to a first respective combination of the plurality of different combinations of summary entries.

* * * * *